(12) United States Patent
Lu et al.

(10) Patent No.: US 8,240,927 B2
(45) Date of Patent: Aug. 14, 2012

(54) CABLE ATTACHMENT SYSTEM FOR A FIBER OPTIC CONNECTOR

(75) Inventors: Yu Lu, Eden Prairie, MN (US); Craig M. Standish, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 213 days.

(21) Appl. No.: 12/838,328

(22) Filed: Jul. 16, 2010

(65) Prior Publication Data
US 2011/0013871 A1  Jan. 20, 2011

Related U.S. Application Data

(60) Provisional application No. 61/226,456, filed on Jul. 17, 2009.

(51) Int. Cl.
G02B 6/38 (2006.01)
(52) U.S. Cl. ........... 385/87; 385/53; 385/54; 385/55; 385/62; 385/69; 385/70; 385/81; 385/86; 385/94; 385/58; 385/100
(58) Field of Classification Search ........... 385/53–55, 385/58, 62, 69–70, 81, 86–87, 94, 100
See application file for complete search history.

(56) References Cited

U.S. PATENT DOCUMENTS

| | | | |
|---|---|---|---|
| 5,835,653 A * | 11/1998 | Barkus | 385/87 |
| 6,409,393 B1 * | 6/2002 | Grois et al. | 385/78 |
| 6,579,014 B2 | 6/2003 | Melton et al. | |
| 6,648,520 B2 | 11/2003 | McDonald et al. | |
| 6,899,467 B2 | 5/2005 | McDonald et al. | |
| 7,744,286 B2 | 6/2010 | Lu et al. | |
| 7,744,288 B2 | 6/2010 | Lu et al. | |
| 2009/0148101 A1 * | 6/2009 | Lu et al. | 385/56 |
| 2009/0148103 A1 * | 6/2009 | Lu et al. | 385/62 |
| 2009/0148104 A1 * | 6/2009 | Lu et al. | 385/72 |

FOREIGN PATENT DOCUMENTS
WO  WO 2009/076364  6/2009

OTHER PUBLICATIONS

U.S. Appl. No. 12/825,111, filed Jun. 28, 2010.
U.S. Appl. No. 12/825,082, filed Jun. 28, 2010.

* cited by examiner

*Primary Examiner* — Brian M. Healy
*Assistant Examiner* — Guy Anderson
(74) *Attorney, Agent, or Firm* — Merchant & Gould P.C.

(57) ABSTRACT

A cable attachment system is disclosed for attaching a fiber optic connector to a fiber optic cable. In particular, strength members of the fiber optic cable are crimped between a crimp sleeve and a cable anchor, and the cable anchor is anchored to the fiber optic connector. An end of the crimp sleeve is adapted to receive an end of a jacket of the fiber optic cable. An end of the cable anchor includes a nipple adapted for insertion into the end of the jacket. An end portion of the jacket is crimped between an intermediate portion of the crimp sleeve and the nipple of the cable anchor. A support portion of the crimp sleeve, positioned between the end and the intermediate portion of crimp sleeve, supports a transitioning portion of the jacket beyond the end of the cable anchor.

23 Claims, 31 Drawing Sheets

CABLE ATTACHMENT SYSTEM FOR A FIBER OPTIC CONNECTOR

CROSS-REFERENCE TO RELATED APPLICATIONS

The present disclosure claims priority to U.S. Provisional Patent Application Ser. No. 61/226,456, entitled "Cable Attachment System for a Fiber Optic Connector" and filed on Jul. 17, 2009, the disclosure of which is hereby incorporated by reference in its entirety.

TECHNICAL FIELD

The present disclosure relates to fiber optic cable connectors used in fiber optic data transmission, and more particularly to attachment systems for attaching the fiber optic cable to the connector.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter can include an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

SUMMARY OF THE DISCLOSURE

The present disclosure relates to a fiber optic cable attachment that attaches a fiber optic connector to a fiber optic cable. The fiber optic cable attachment includes a crimp sleeve and a cable anchor. The crimp sleeve extends from a proximal end to a distal end. The proximal end of the crimp sleeve includes a cable support portion that supports an end of a cable jacket of the fiber optic cable. The crimp sleeve includes a crimp portion positioned between the cable support portion and the distal end of the crimp sleeve. The cable anchor includes a central passage that extends from a proximal end to a distal end of the cable anchor. The proximal end of the cable anchor includes a jacket support protrusion positioned within an opening at the end of the cable jacket. The cable anchor includes an exterior crimp support positioned between the jacket support protrusion and the distal end of the cable anchor. The exterior crimp support is positioned within the crimp portion of the crimp sleeve. Strength members of the fiber optic cable are crimped between the crimp portion of the crimp sleeve and the exterior crimp support of the cable anchor. An end portion of the cable jacket is crimped between the crimp portion of the crimp sleeve and the jacket support protrusion of the cable anchor. A transitioning portion of the cable jacket is adjacent the end portion of the cable jacket, and the transitioning portion is positioned within the cable support portion of the crimp sleeve.

The fiber optic cable attachment can include a first piece of the fiber optic connector that includes a first pocket or a first opening. The cable anchor can include a first retention protrusion that is positioned within the first pocket or the first opening. The fiber optic cable attachment can include a second piece of the fiber optic connector that includes a second pocket or a second opening. The cable anchor can include a second retention protrusion that is positioned within the second pocket or the second opening. The first and the second pieces of the fiber optic connector can be attached to each other. The first and the second retention protrusions of the cable anchor can be positioned on opposite sides of the cable anchor. The crimp sleeve of the fiber optic cable attachment can include a first and a second material accumulation region positioned on opposite sides of the crimp sleeve. The first and the second material accumulation regions can respectively form a first and a second ridge on an exterior of the crimp sleeve and a first and a second channel on an interior of the crimp sleeve. At least some of the strength members of the fiber optic cable can be positioned within the first and/or the second channels on the interior of the crimp sleeve. The first and the second ridges on the exterior of the crimp sleeve can include undulating ridges and/or can be partially sheared and form a first and a second set of offset ridge segments. The cable support portion of the crimp sleeve can include indents at the proximal end of the crimp sleeve. The exterior crimp support and/or the cable jacket can be generally cylindrical. The end of the cable jacket of the fiber optic cable can abut a shoulder of the cable anchor that is positioned between the jacket support protrusion and the exterior crimp support. The distal end of the cable anchor can abut a spring holder of the fiber optic connector.

The present disclosure also relates to a method of attaching the fiber optic connector to the fiber optic cable. The method includes: inserting an optical fiber of the fiber optic cable through the central passage of the cable anchor, inserting the jacket support protrusion of the cable anchor into the opening at the end of the cable jacket of the fiber optic cable until the jacket support protrusion is positioned within the end portion of the cable jacket, positioning the strength members of the fiber optic cable around the exterior crimp support of the cable anchor, positioning the crimp sleeve around the exterior crimp support and the end portion of the cable jacket and the transitioning portion of the cable jacket, crimping an end portion of the strength members between the crimp portion of the crimp sleeve and the exterior crimp support of the cable anchor, and crimping the end portion of the cable jacket between the crimp portion of the crimp sleeve and the jacket support protrusion of the cable anchor.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Figure 1:
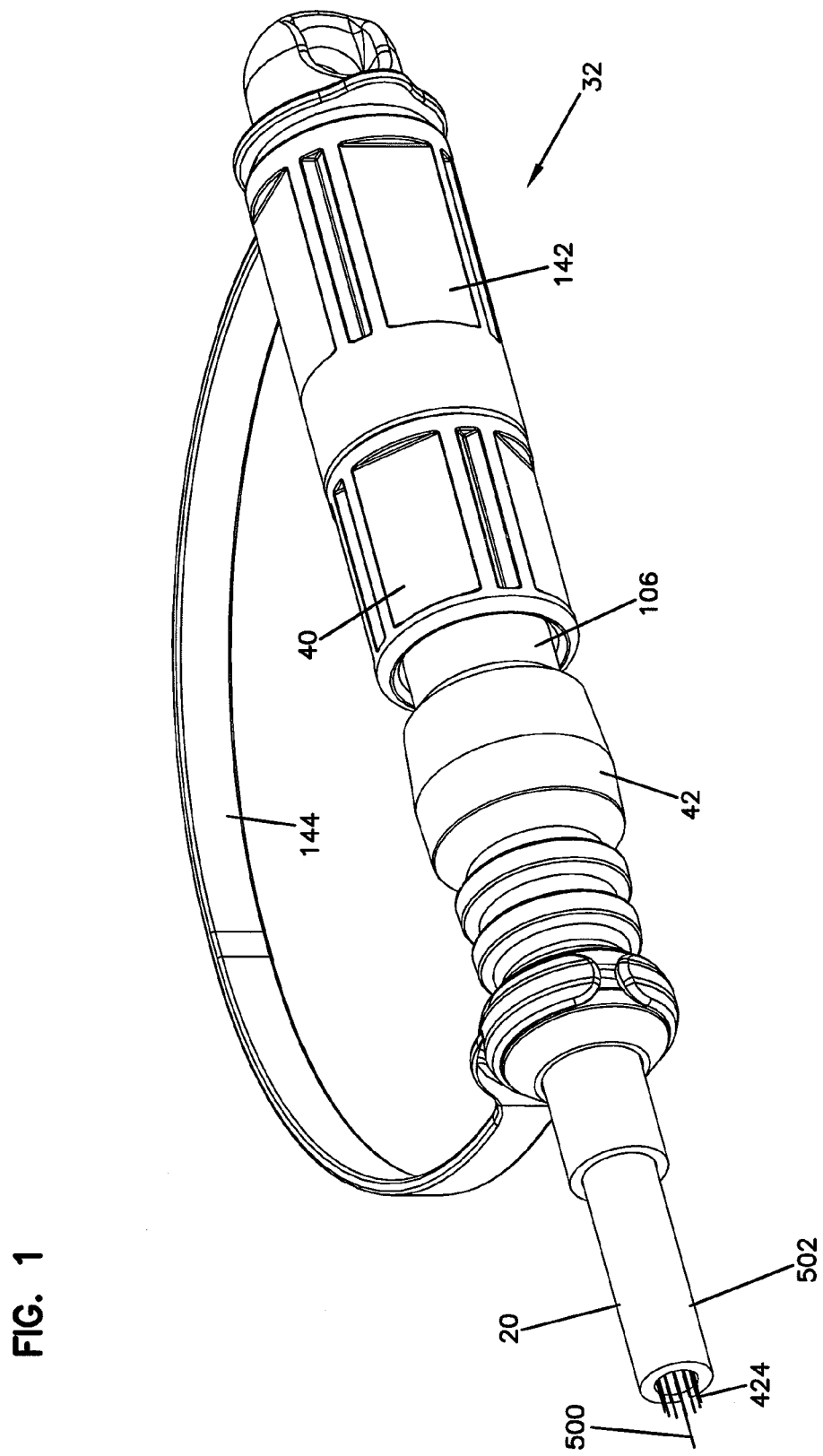
FIG. 1 is a perspective view of an example fiber optic connector terminating a fiber optic cable.

FIGS. 2, 3, 5, 6, 8, 9, 11, and 12 depict a fiber optic cable attachment system, in accordance with the principles of the present disclosure, that attaches an example fiber optic connector 32 to an example fiber optic cable 20. The example fiber optic connector 32 includes, among other things, a coupling nut 40, a boot 42, a ferrule assembly 43, sealing members 49, 69, a sealing tube 106, a cap 142, and a cap strap 144 (see FIGS. 1, 2, 7, and 8). Other fiber optic connectors may not include certain components included in the example fiber optic connector 32 and still practice the cable attachment principles of the present disclosure. Yet other fiber optic connectors may include additional components not included in the example fiber optic connector 32 and still practice the cable attachment principles of the present disclosure. For further details on the example fiber optic connector 32 and the connector terminated fiber optic cable 20, see U.S. Provisional Patent Application Ser. No. 61/007,222, filed Dec. 11, 2007; U.S. Provisional Patent Application Ser. No. 61/029,524, filed Feb. 18, 2008; and the following U.S. patent applications, all filed on Sept. 03, 2008: U.S. patent application Ser. No. 12/203,508, now U.S. Patent No. 7,744,288, entitled "Hardened Fiber Optic Connector Compatible with Hardened and Non-Hardened Fiber Optic Adapters"; U.S. patent application Ser. No. 12/203,522, now U.S. Patent No. 7,762,726, entitled "Hardened Fiber Optic Connection System"; U.S. patent application Ser. No. 12/203,530, now U.S. Patent No. 7,744,286, entitled "Hardened Fiber Optic Connection System with Multiple Configurations"; and U.S. patent application Ser. No. 12/203,535, now U.S. Patent Pub. No. 2009/0148103, entitled "Hardened Fiber Optic Connector and Cable Assembly with Multiple Configurations"; which applications are hereby incorporated by reference in their entirety.

Figure 10:
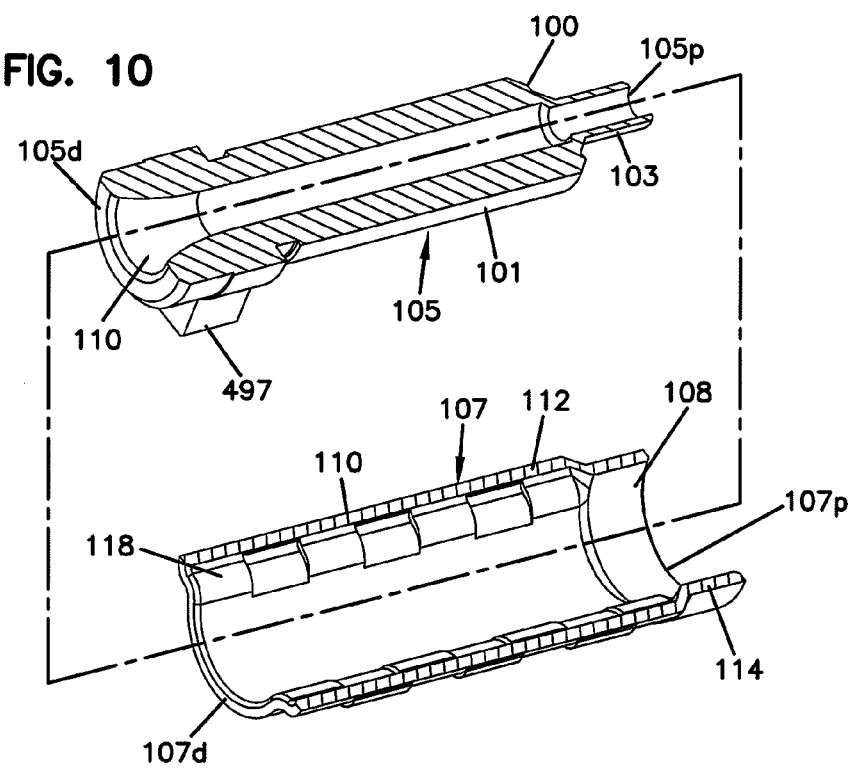
FIG. 10 is an exploded perspective view with the same perspective of FIG. 7 further illustrating the cable anchor and the anchor crimp band of FIG. 3.
Figure 11:
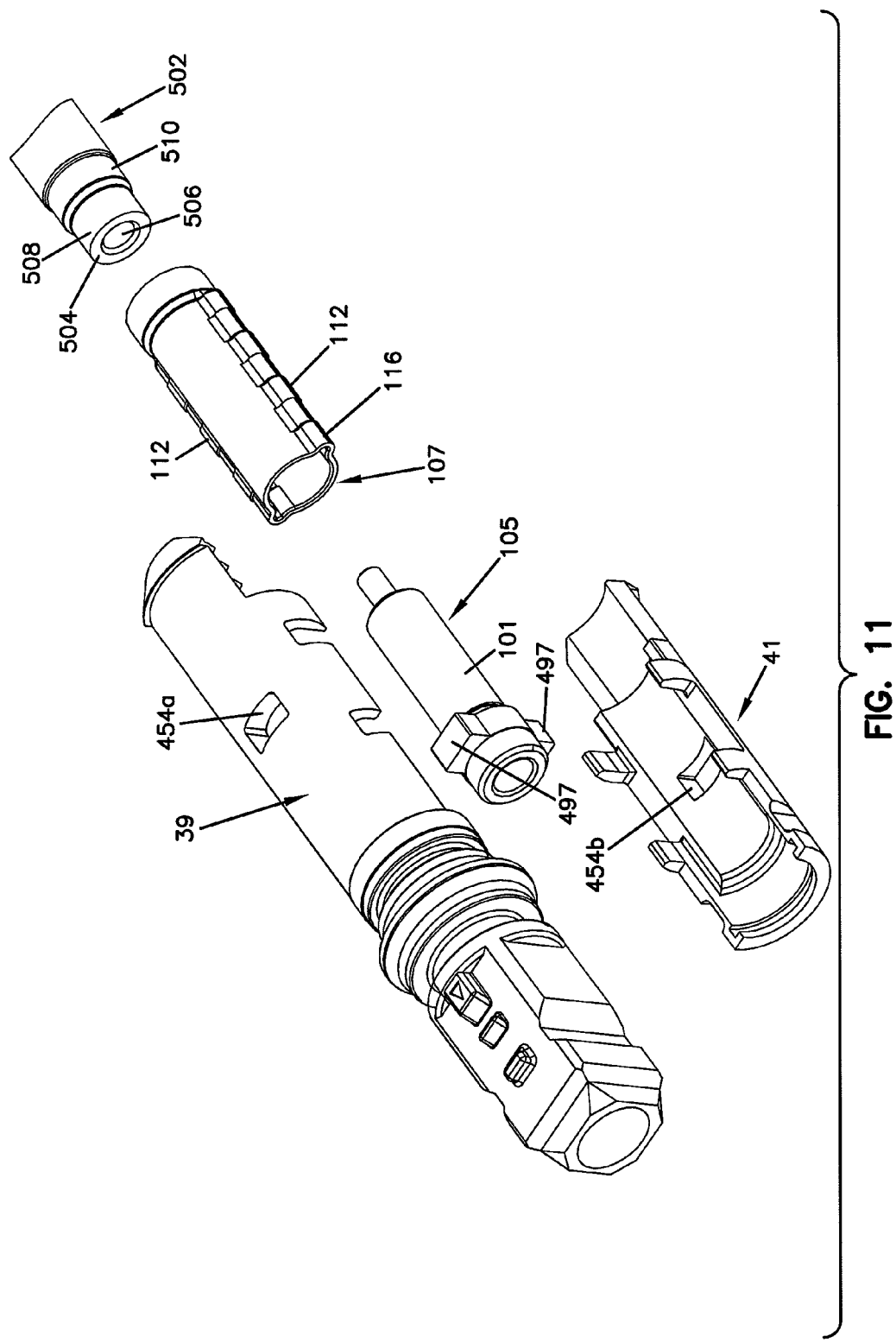
FIG. 11 is yet another exploded perspective view illustrating the cable anchor and the anchor crimp band of FIG. 3, a connector housing and a cover of the fiber optic connector of FIG. 1, and a cable jacket of the fiber optic cable of FIG. 1.
Figure 12:
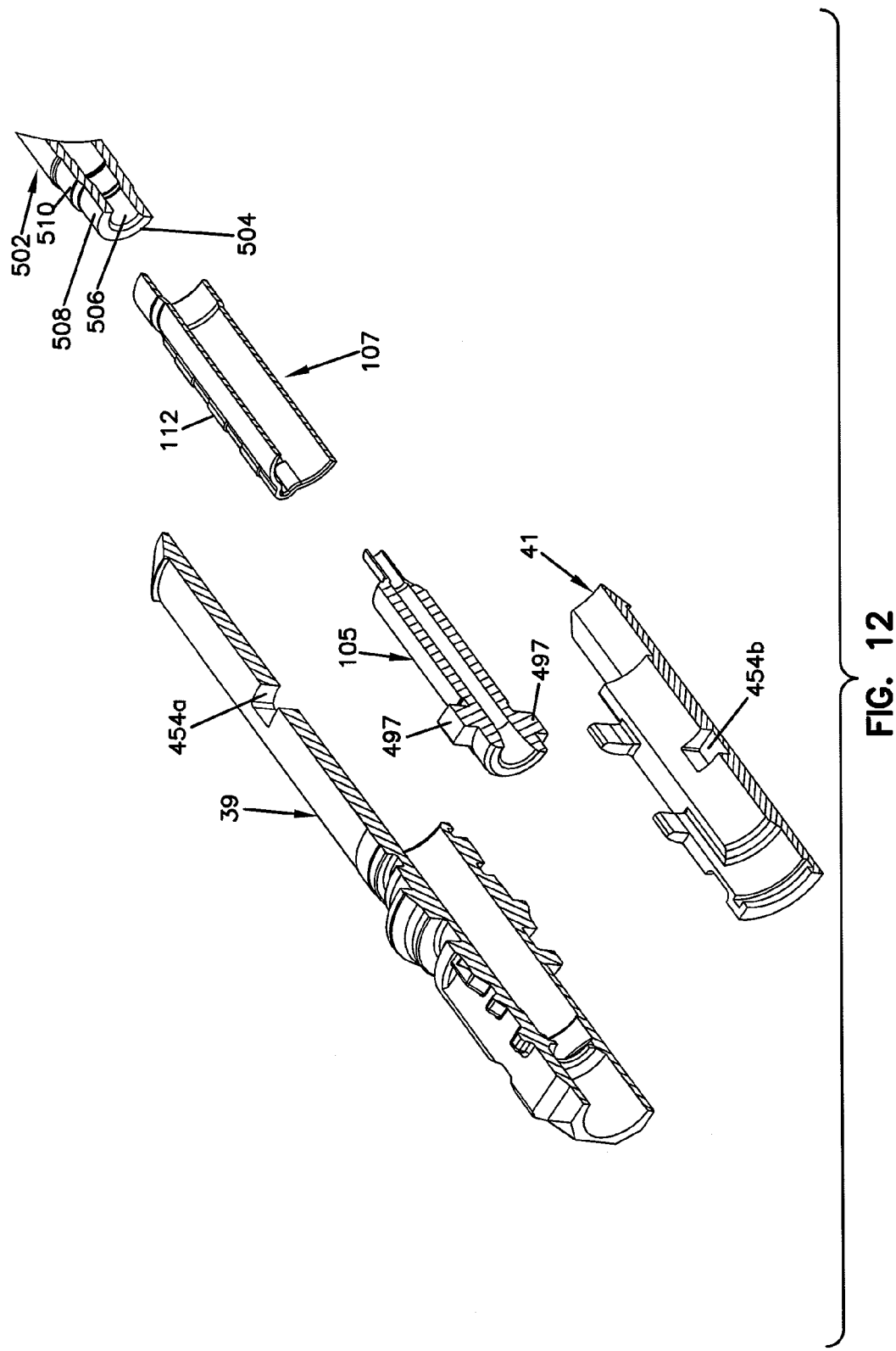
FIG. 12 is the perspective view of FIG. 11 but with the fiber optic connector and the cable jacket shown in cross-section.
Figure 13:
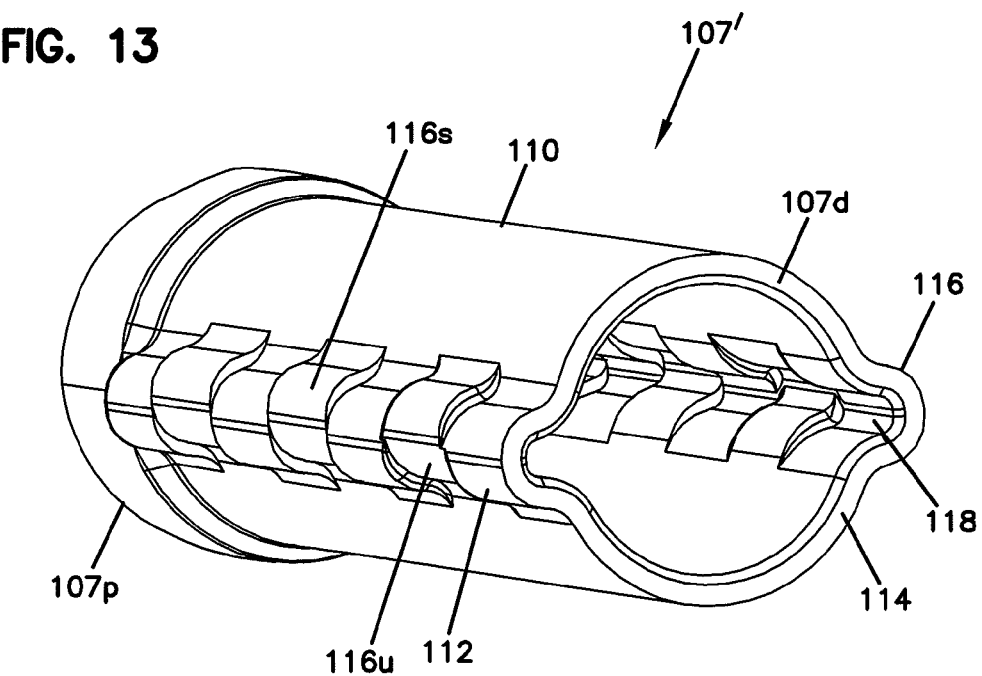
FIG. 13 is a perspective view of another example anchor crimp band similar to the anchor crimp band of FIG. 3.
Figure 14:
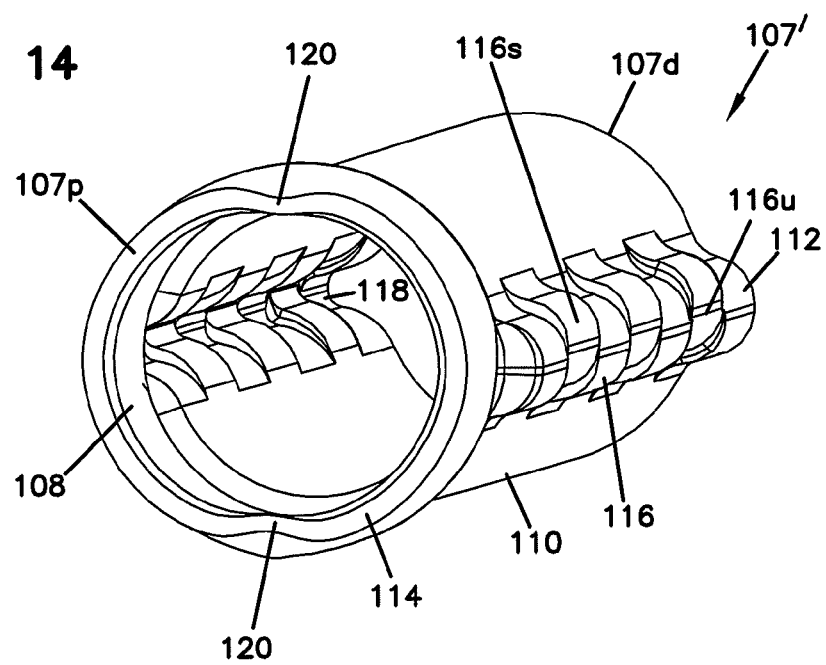
FIG. 14 is another perspective view of the anchor crimp band of FIG. 13.
Figure 15:
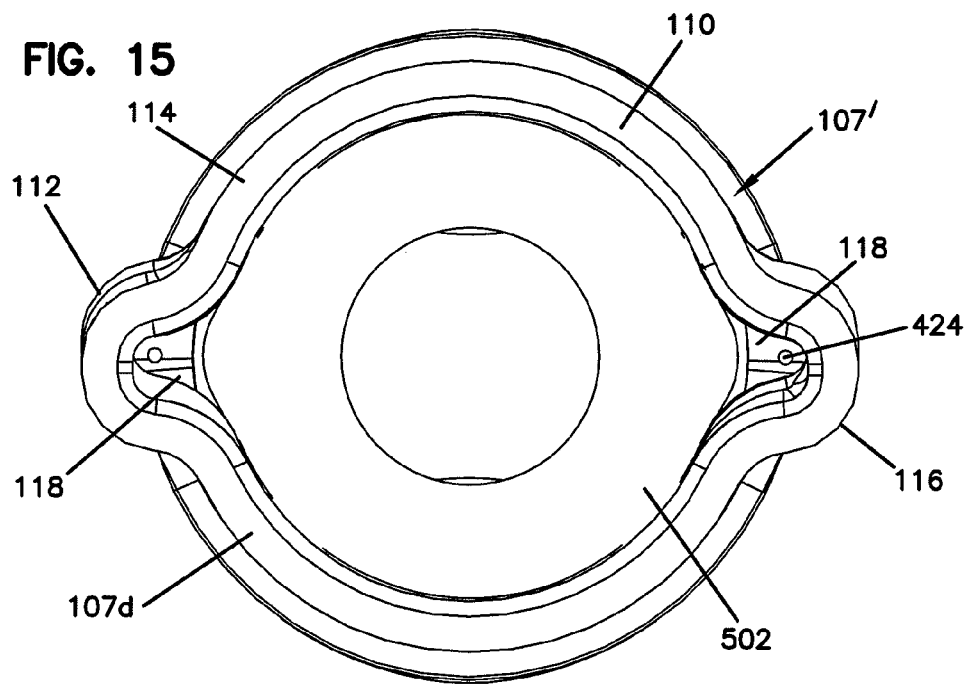
FIG. 15 is an elevation view of the anchor crimp band of FIG. 13 and the cable jacket of FIG. 11 in a direction facing toward the cable jacket.
Figure 16:
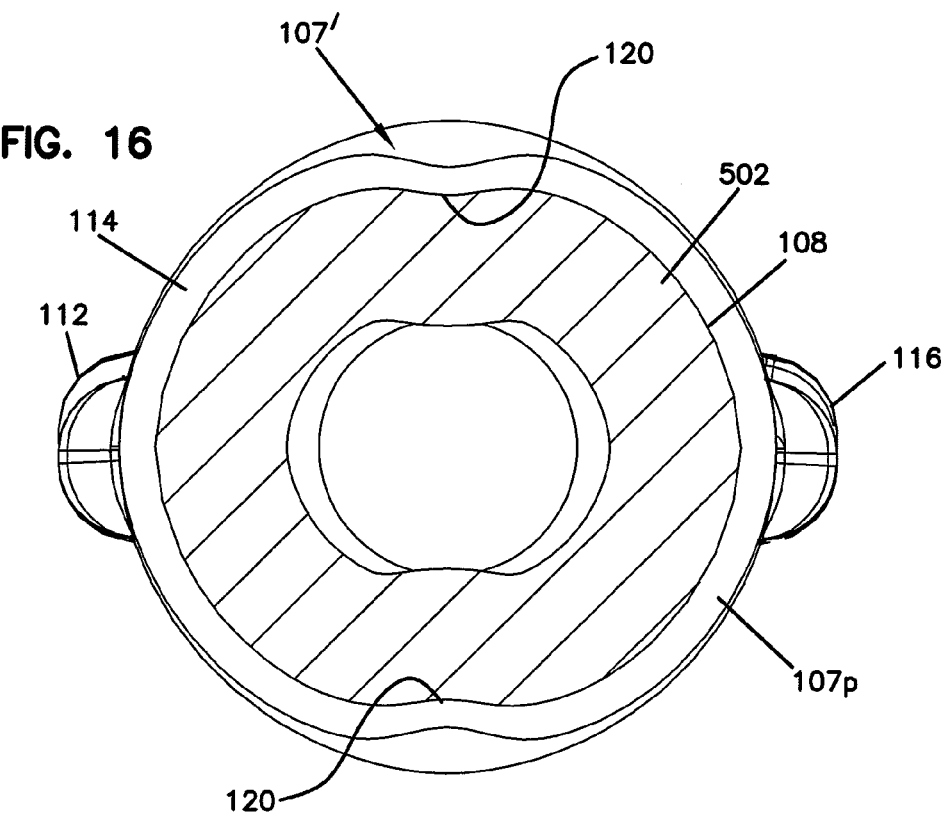
FIG. 16 is an elevation view of the anchor crimp band of FIG. 13 and the cable jacket of FIG. 11 in a direction opposite the direction of FIG. 15 and the cable jacket shown in cross-section.
Figure 17:
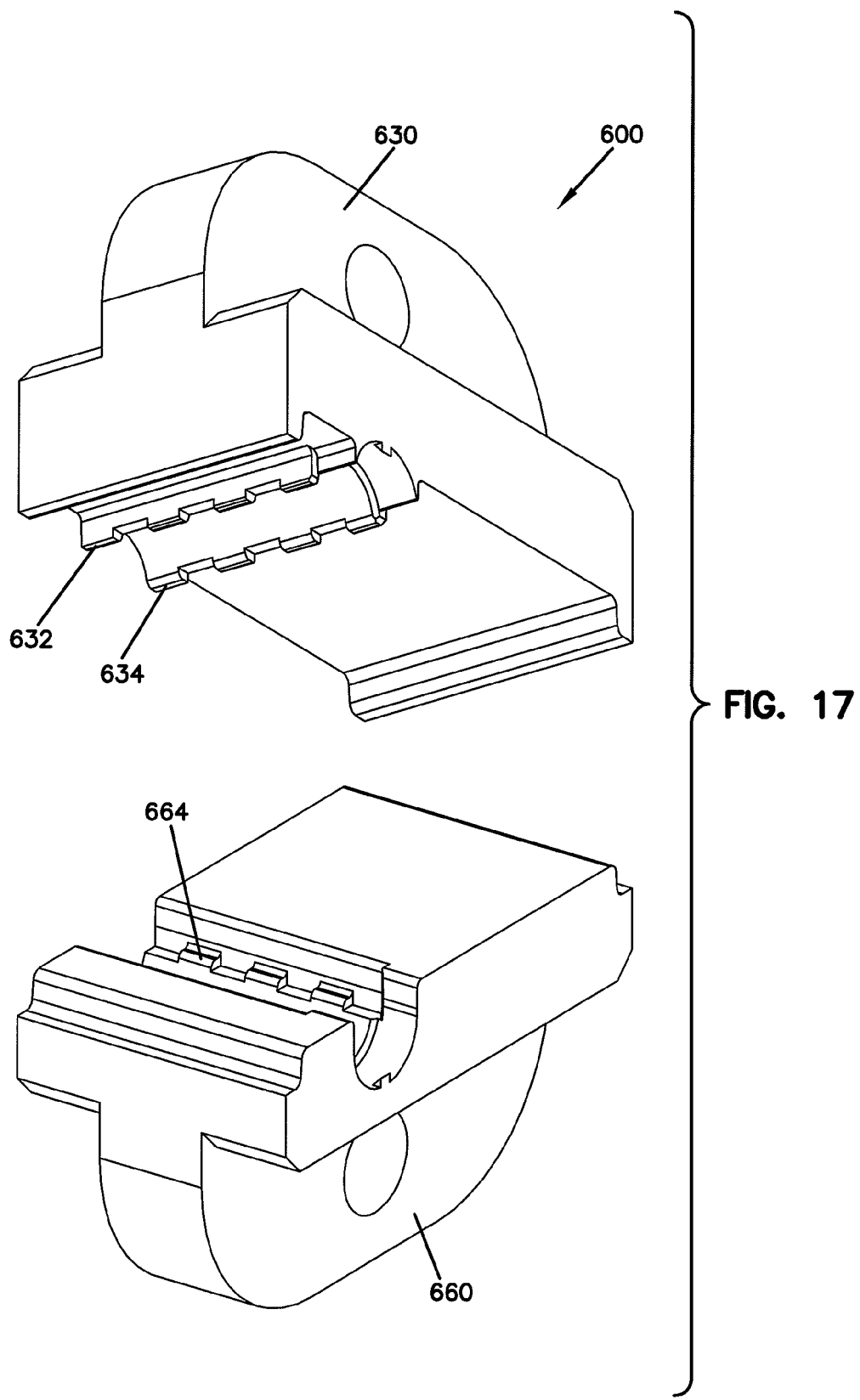
FIG. 17 is an exploded perspective view of an example crimp tool assembly including an upper tool and a lower tool that are adapted to crimp the anchor crimp band of FIG. 13.

As illustrated at FIGS. 2-6, the fiber optic cable attachment system includes a crimp sleeve 107 (i.e., a crimp band, a crimp ring, etc.) and a cable anchor 105 (i.e., a fitting, a crimp block, an anchor piece, etc.). The crimp sleeve 107 extends from a proximal end 107p to a distal end 107d (see FIGS. 4 and 10). The proximal end 107p of the crimp sleeve 107 includes a cable support portion 108 that supports an end 504 of a cable jacket 502 of the fiber optic cable 20 (see FIGS. 11 and 12). The crimp sleeve 107 includes a crimp portion 110 positioned between the cable support portion 108 and the distal end 107d of the crimp sleeve 107.

The cable anchor 105 includes a central passage 102 that extends from a proximal end 105p to a distal end 105d. The proximal end 105p of the cable anchor 105 includes a jacket support protrusion 103 positioned within an opening 506 at the end 504 of the cable jacket 502 (see FIGS. 6, 11, and 12). The cable anchor 105 includes an exterior crimp support 101 positioned between the jacket support protrusion 103 and the distal end 105d of the cable anchor 105. The exterior crimp support 101 is positioned within the crimp portion 110 of the crimp sleeve 107. The exterior crimp support 101 and/or the cable jacket 502 can be generally cylindrical. The end 504 of the cable jacket 502 of the fiber optic cable 20 can abut a shoulder 100 of the cable anchor 105. The shoulder 100 is positioned between the jacket support protrusion 103 and the exterior crimp support 101. The distal end 105d of the cable anchor 105 can abut a spring holder 104 of the fiber optic connector 32.

The crimp portion 110 traverses the exterior crimp support 101 and also overlaps a portion of the jacket support protrusion 103. The cable support portion 108 overlaps a portion of the jacket support protrusion 103 and also extends proximally beyond the proximal end 105p of the cable anchor 105. Strength members 424 (i.e., reinforcing fibers) of the fiber optic cable 20 are crimped between the crimp portion 110 of the crimp sleeve 107 and the exterior crimp support 101 of the cable anchor 105. An end portion 508 (see FIGS. 5, 11, and 12) of the cable jacket 502 is crimped between the crimp portion 110 of the crimp sleeve 107 and the jacket support protrusion 103 of the cable anchor 105. A transitioning portion 510 (see FIGS. 5, 11, and 12) of the cable jacket 502 is adjacent the end portion 508 of the cable jacket 502, and the transitioning portion 510 is positioned within the cable support portion 108 of the crimp sleeve 107. In the depicted embodiment, the exterior crimp support 101 is cylindrical, and a majority of the crimp portion 110 is generally cylindrical after crimping.

Figure 2:
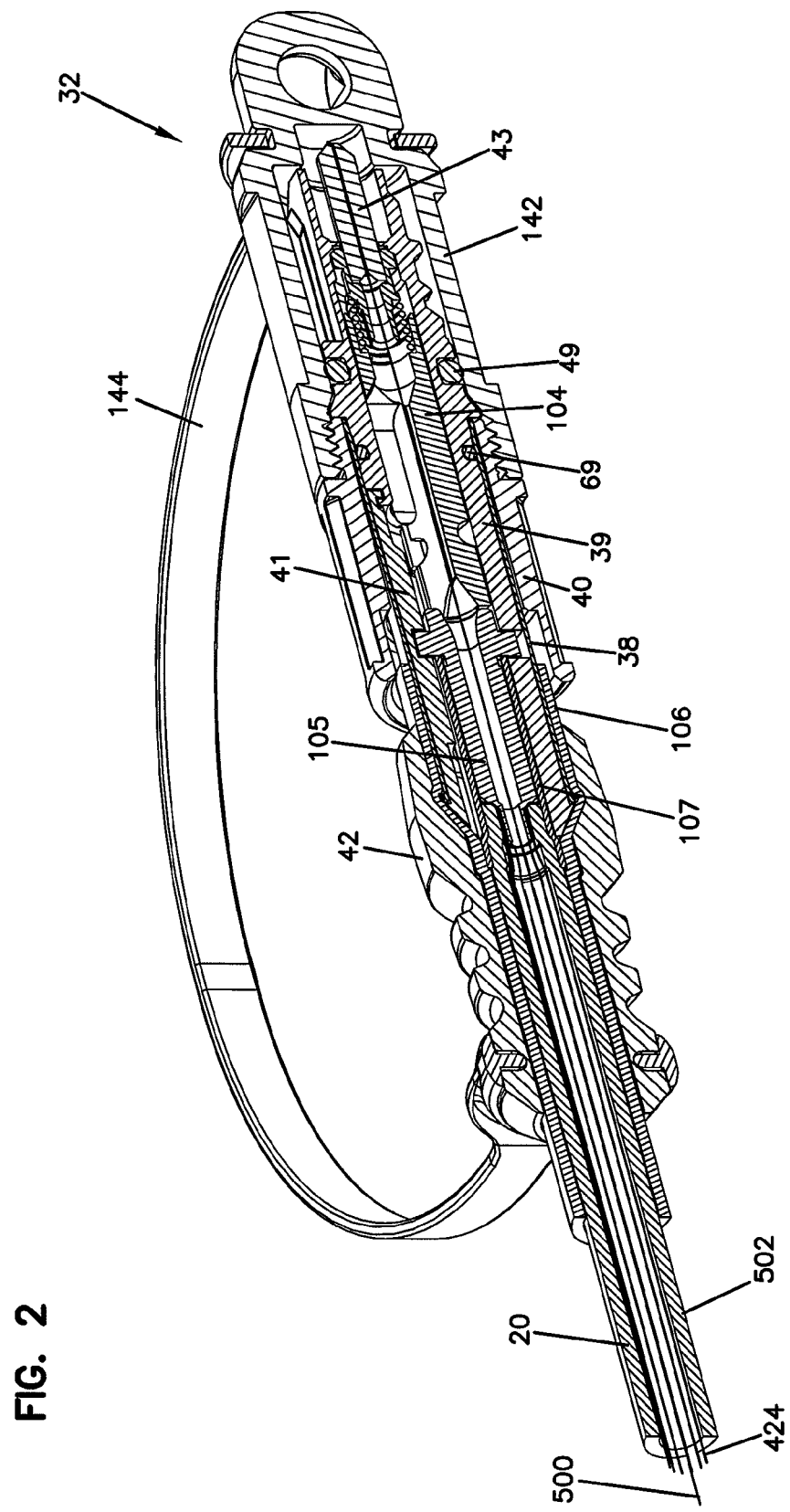
FIG. 2 is the perspective view of FIG. 1 but with the fiber optic connector shown in cross-section.
Figure 3:
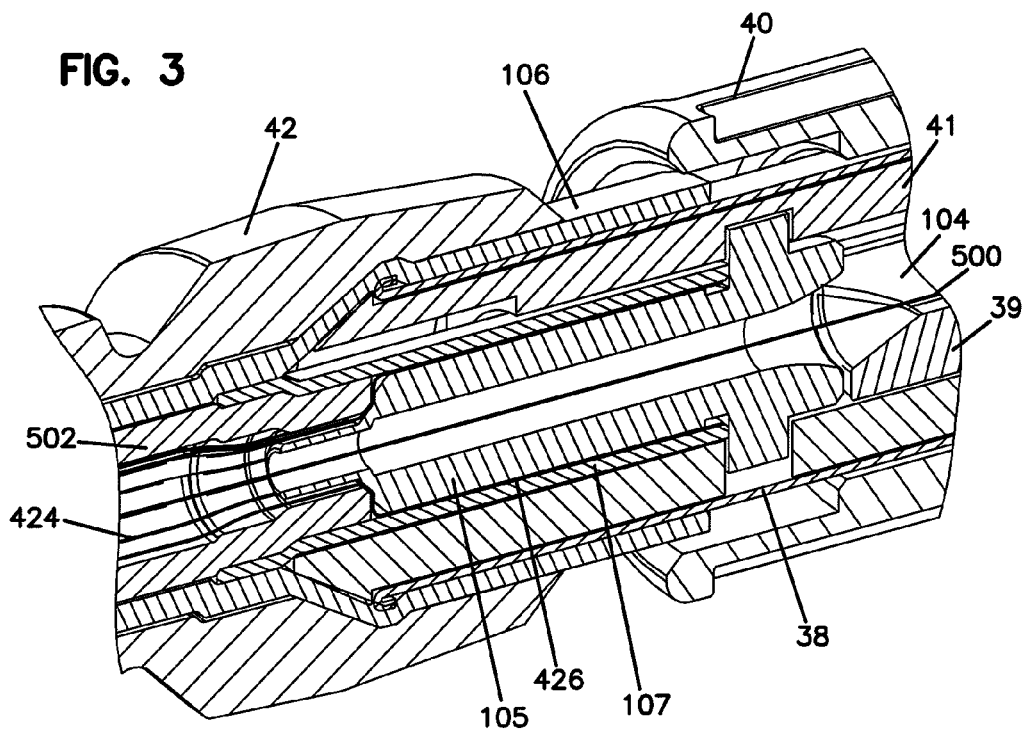
FIG. 3 is an enlarged portion of FIG. 2 illustrating an example cable anchor and an example anchor crimp band of the fiber optic connector of FIG. 1.
Figure 4:
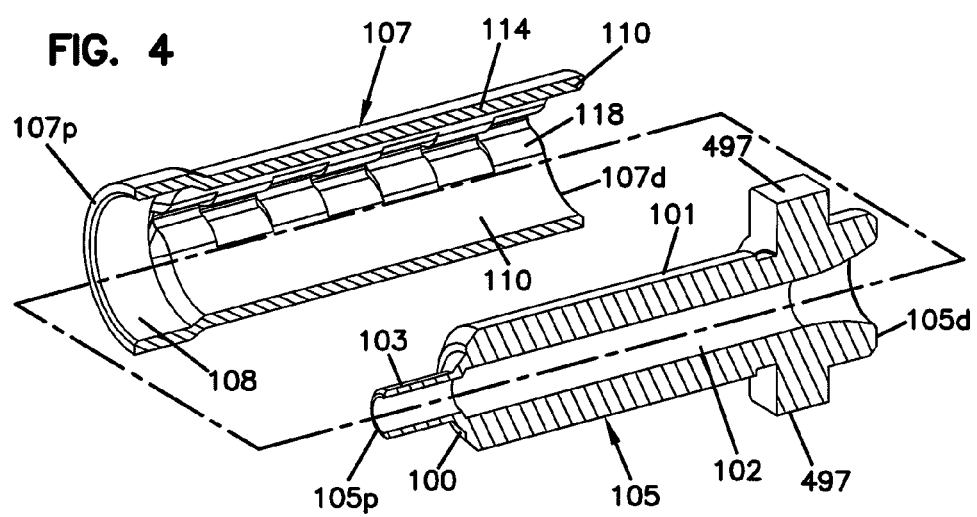
FIG. 4 is an exploded perspective view with the same perspective of FIG. 1 further illustrating the cable anchor and the anchor crimp band of FIG. 3.
Figure 5:
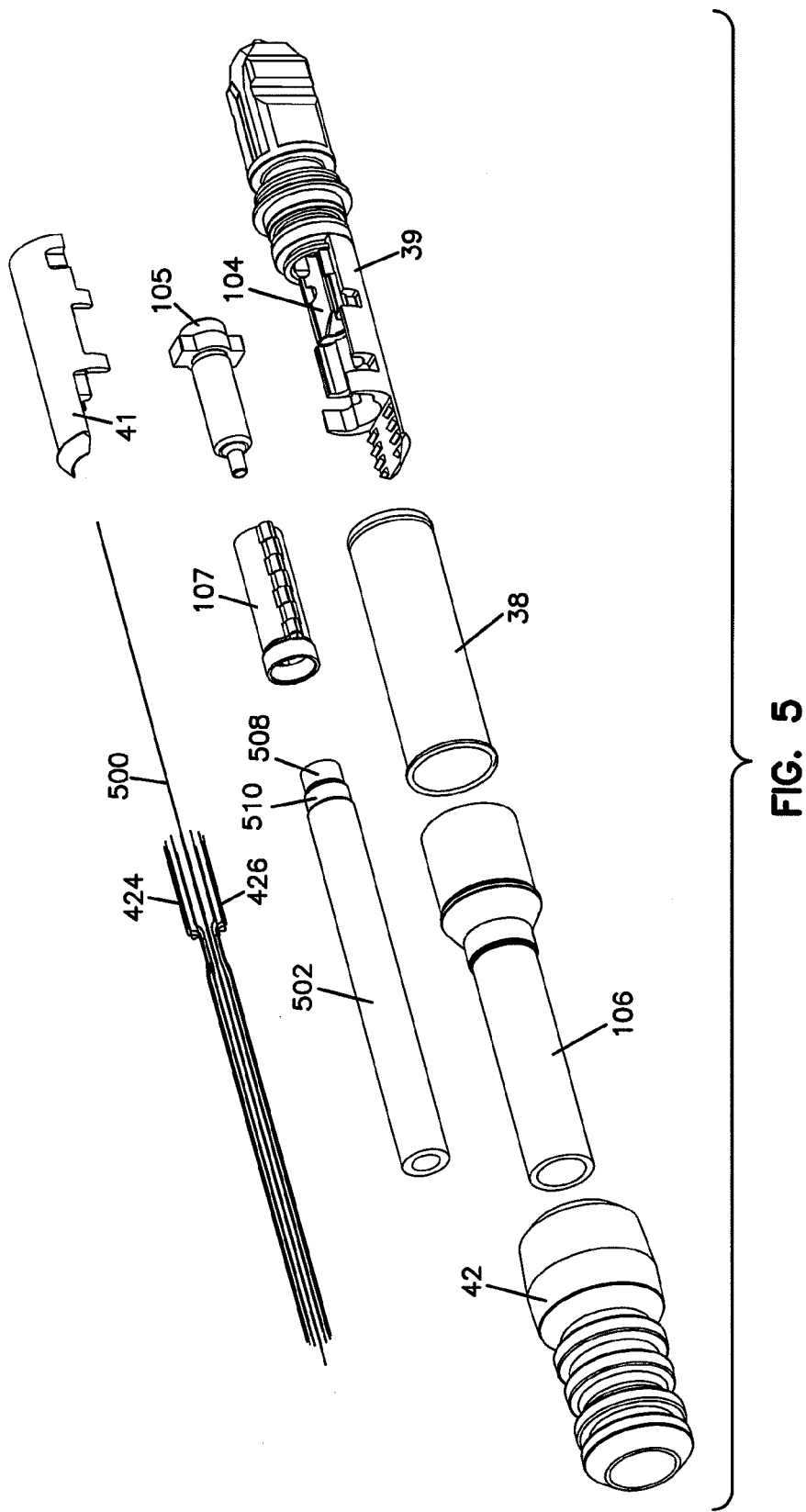
FIG. 5 is an exploded perspective view with the same perspective of FIG. 1 further illustrating the fiber optic connector of FIG. 1.
Figure 6:
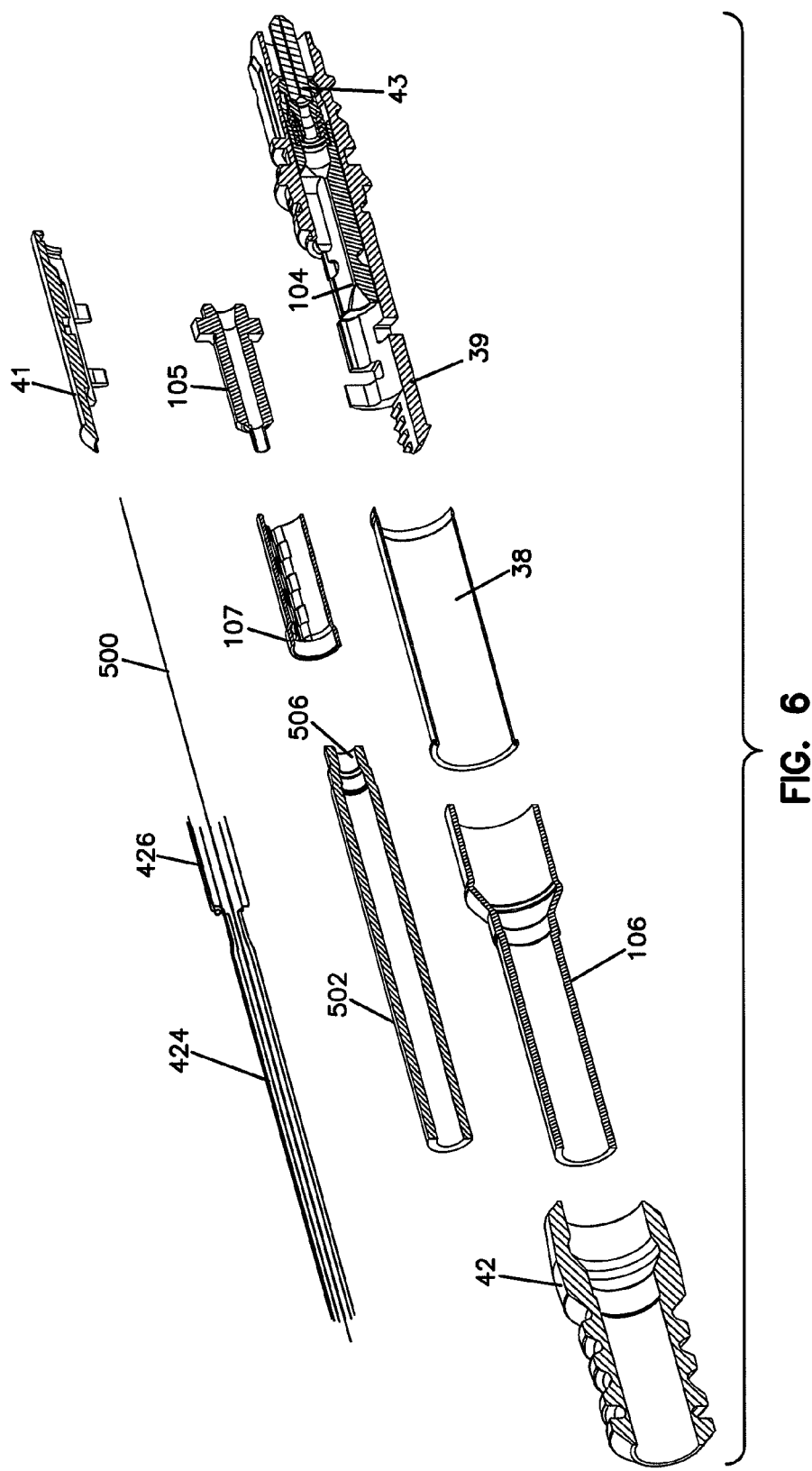
FIG. 6 is the perspective view of FIG. 5 but with the fiber optic connector shown in cross-section.
Figure 7:
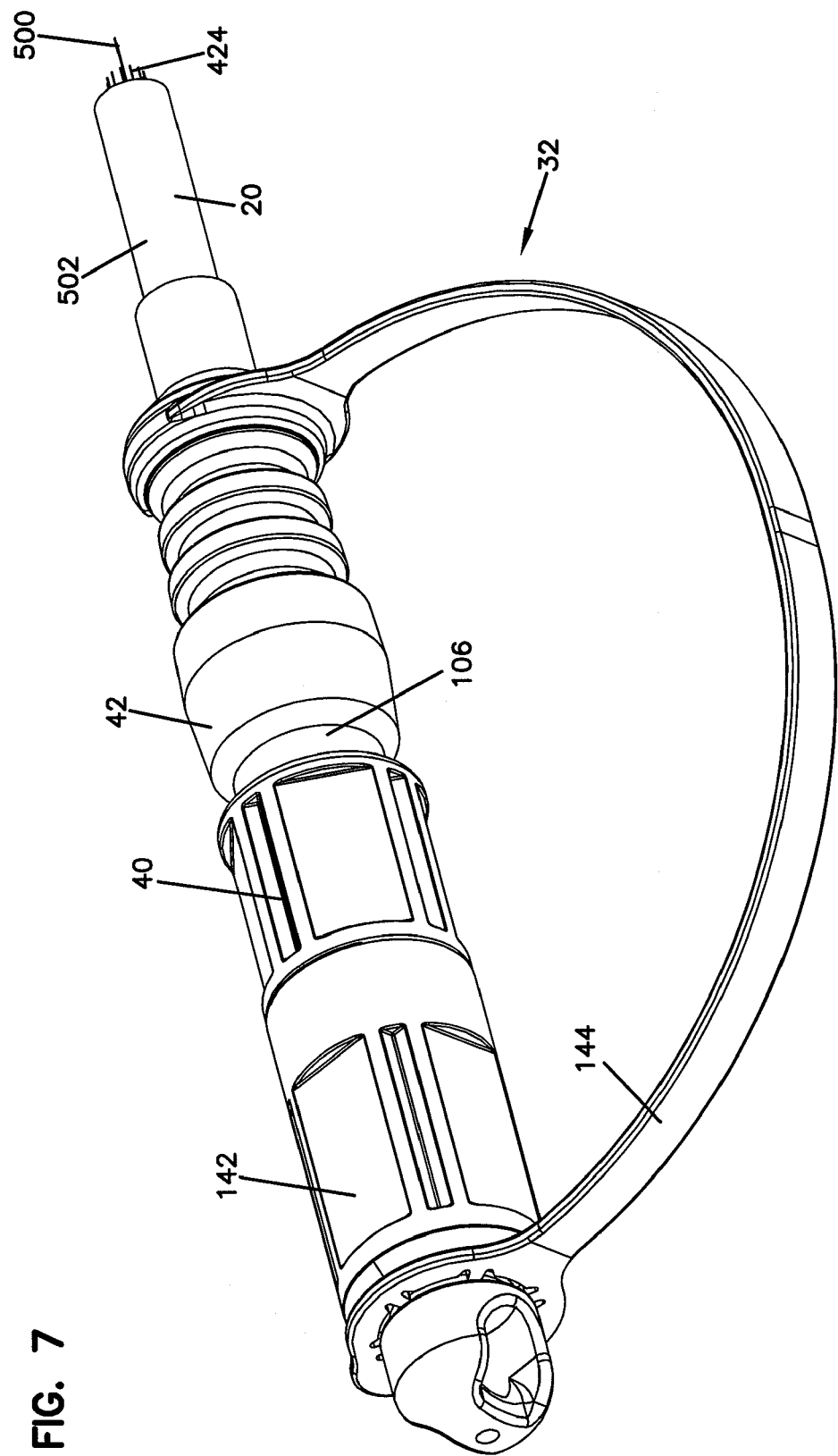
FIG. 7 is another perspective view of the fiber optic connector and fiber optic cable of FIG. 1.
Figure 8:
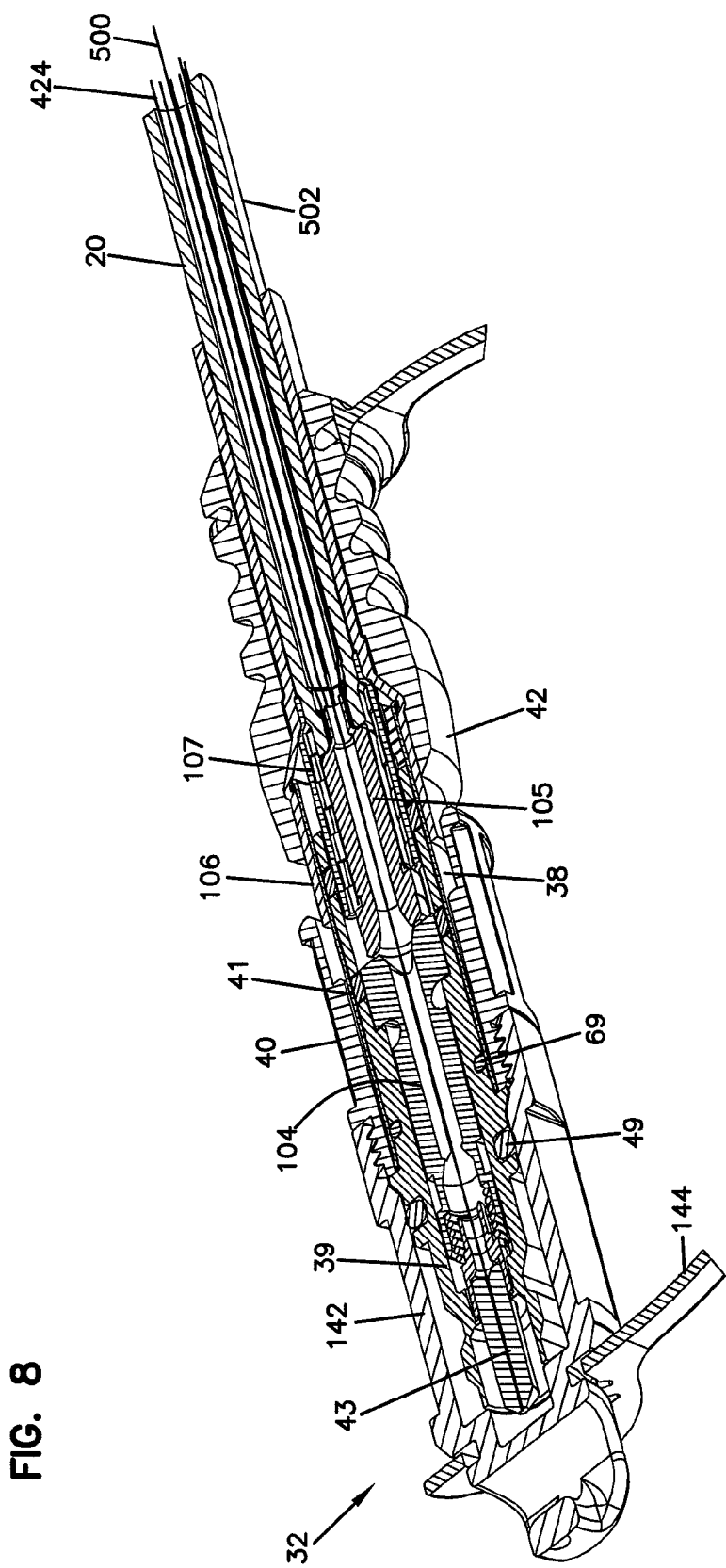
FIG. 8 is the perspective view of FIG. 7 but with the fiber optic connector shown in cross-section.
Figure 9:
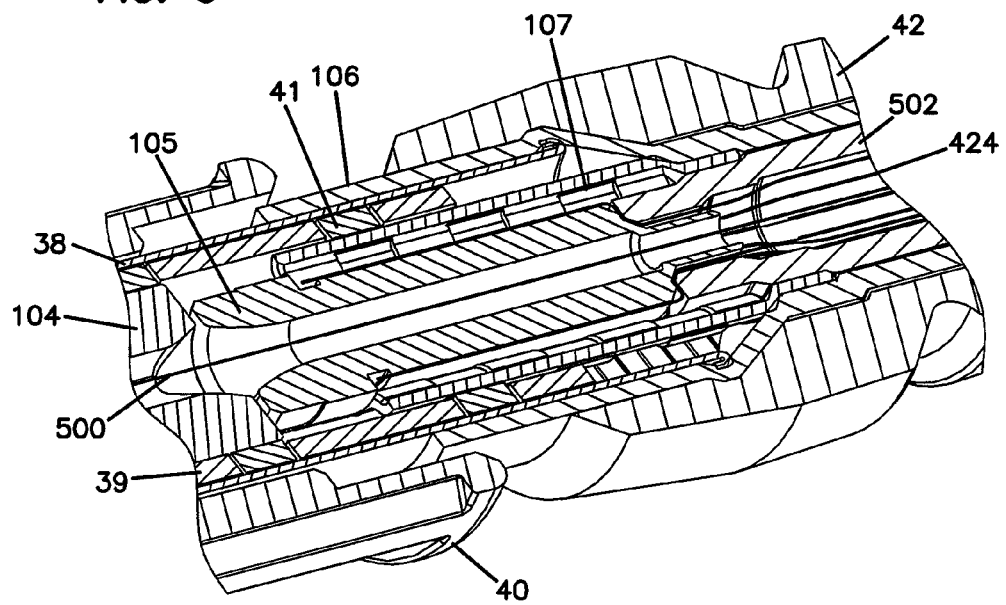
FIG. 9 is an enlarged portion of FIG. 8 illustrating the cable anchor and the anchor crimp band of FIG. 3.

The fiber optic cable attachment system can include a first piece 39 (e.g., a connector housing) of the fiber optic connector 32 that includes a first receiver 454a (e.g., a pocket, an opening, etc.). The cable anchor 105 can include a first retention protrusion 497 that is positioned within the first receiver 454a on the first piece 39. The fiber optic cable attachment system can also include a second piece 41 (e.g., a cover) of the fiber optic connector 32 that includes a second receiver 454b (e.g., a pocket, an opening, etc.). The cable anchor 105 can include a second retention protrusion 497 that is positioned within the second receiver 454b. As illustrated at FIGS. 2 and 5, the first and the second pieces 39, 41 of the fiber optic connector 32 can be held together (e.g., with a band 38) and thereby capture (i.e., trap, retain, etc.) the cable anchor 105 within the fiber optic connector 32. The pair of retention protrusions 497 of the cable anchor 105 can be positioned on opposite sides of the cable anchor 105 from each other.

As shown at FIGS. 13-16, the cable support portion 108 of an alternate crimp sleeve 107' can include indents 120 at the proximal end 107p of the crimp sleeve 107'. The indents 120 can buckle a wall of the cable jacket 502 (see FIG. 16). The indents 120 can hold or assist in holding the cable jacket 502 within the crimp sleeve 107'. Other features of the crimp sleeve 107' can be similar to the crimp sleeve 107.

As shown at FIGS. 10-16, the crimp sleeve 107, 107' of the fiber optic cable attachment system can include a pair of material accumulation regions 112 positioned on opposite sides of the crimp sleeve 107, 107' from each other. The pair of material accumulation regions 112 can form a pair of ridges 116 on an exterior of the crimp sleeve 107, 107' and a pair of channels 118 within an interior of the crimp sleeve 107, 107'. At least some of the strength members 424 of the fiber optic cable 20 can be positioned within either one or both of the channels 118 on the interior of the crimp sleeve 107, 107' (see FIG. 15). The pair of the ridges 116 on the exterior of the crimp sleeve 107, 107' can include undulating ridges 116u and/or can be partially sheared to form offset ridge segments 116s (i.e., a series of upper and lower ridge segments). The undulating ridges 116u can continue smoothly without any shearing or cracking and/or form the offset ridge segments 116s. In the depicted embodiment, the ridges 116 include the adjacent ridge segments 116s that are staggered or offset from one another thus forming an undulating pattern. Either one or both of the ridges 116 can include the undulating ridges 116u and/or the offset ridge segments 116s and/or a simple ridge that does not undulate nor have offset segments (not shown).

The undulating ridges 116u and/or the offset ridge segments 116s can form teeth on the ridges 116 that can provide additional holding power between the fiber optic cable 20 and the cable anchor 105. The undulating ridges 116u and the offset ridge segments 116s can further accumulate material during the crimping process resulting in a tighter fit of the crimp portion 110 against the strength members 424 and a tighter fit of the crimp portion 110 against the end portion 508 of the cable jacket 502. The undulating ridges 116u can transition smoothly from tooth to tooth or can included shearing or tearing of a wall 114 of the crimp sleeve 107, 107'.

The present disclosure also relates to a method of attaching the fiber optic connector 32 to the fiber optic cable 20. The method includes: inserting an optical fiber 500 of the fiber optic cable 20 through the central passage 102 of the cable anchor 105, inserting the jacket support protrusion 103 of the cable anchor 105 into the opening 506 at the end 504 of the cable jacket 502 of the fiber optic cable 20 until the jacket support protrusion 103 is positioned within the end portion 508 of the cable jacket 502, positioning the strength members 424 of the fiber optic cable 20 around the exterior crimp support 101 of the cable anchor 105, positioning the crimp sleeve 107, 107' around the exterior crimp support 101 and the end portion 508 of the cable jacket 502 (including a portion of the cable jacket 502 that will become the transitioning portion 510), crimping an end portion 426 of the strength members 424 between the crimp portion 110 of the crimp sleeve 107, 107' and the exterior crimp support 101 of the cable anchor 105, and crimping the end portion 508 of the cable jacket 502 between the crimp portion 110 of the crimp sleeve 107, 107' and the jacket support protrusion 103 of the cable anchor 105. The transitioning portion 510 of the cable jacket 502 can also be formed and/or crimped within the cable support portion 108. Air (e.g., compressed air) can be used to route the strength members 424 along a route between the crimp sleeve 107, 107' and the cable anchor 105 during the attachment process. An air nozzle (e.g., an annular air nozzle) can be used to both route the strength members 424 and maintain a sufficiently uniform density of the strength members 424 between the crimp sleeve 107, 107' and the cable anchor 105. The attached cable anchor 105 can be placed between the first piece 39 and the second piece 41 of the fiber optic connector 32 with the first retention protrusion 497 positioned within the first receiver 454a and the second retention protrusion 497 positioned within the second receiver 454b. The first and the second pieces 39, 41 of the fiber optic connector 32 can be held together (e.g., with the band 38 and/or with adhesive, etc.) and thereby capture (i.e., trap, retain, etc.) the cable anchor 105 within the fiber optic connector 32.

Figure 18:
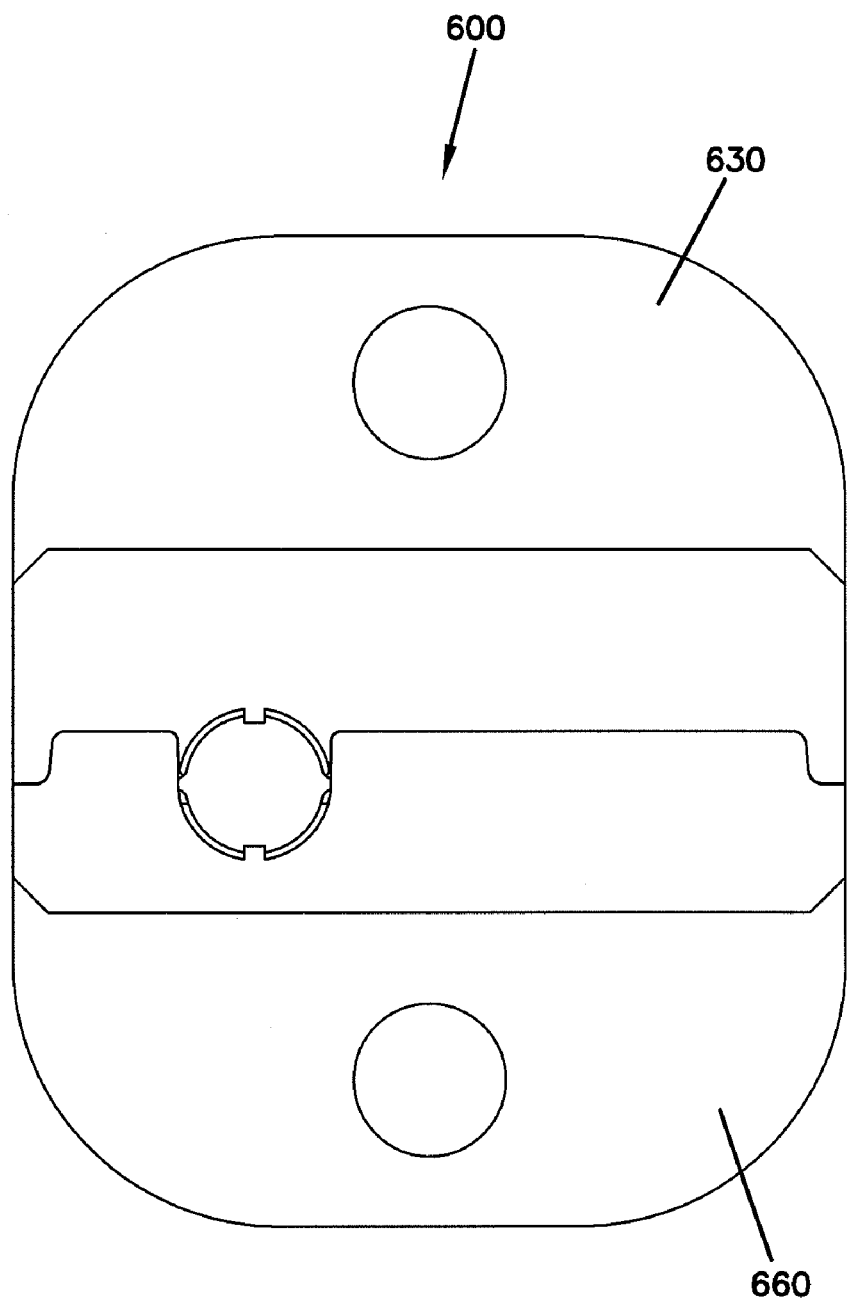
FIG. 18 is an elevation view of the crimp tool assembly of FIG. 17.
Figure 19:
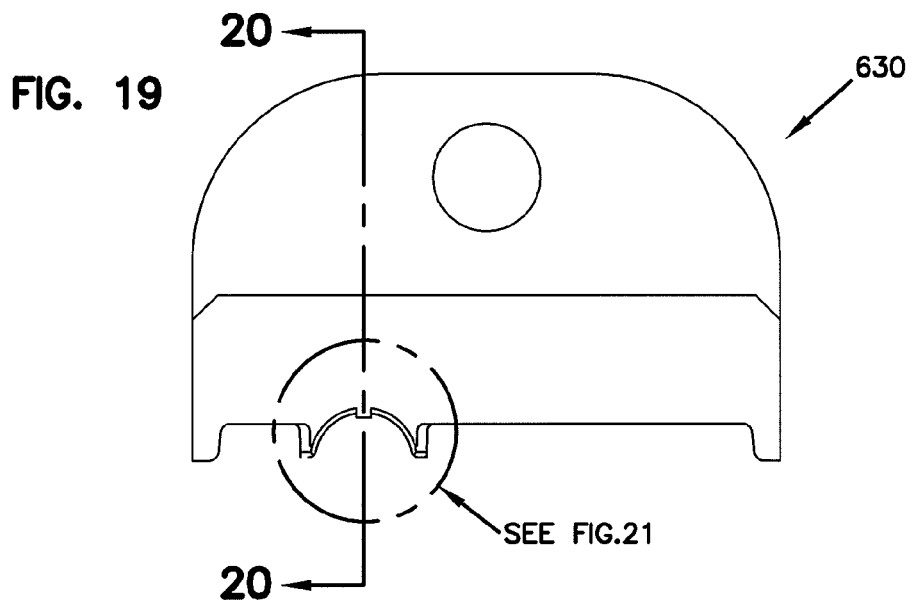
FIG. 19 is an elevation view of the upper tool of FIG. 17.
Figure 20:
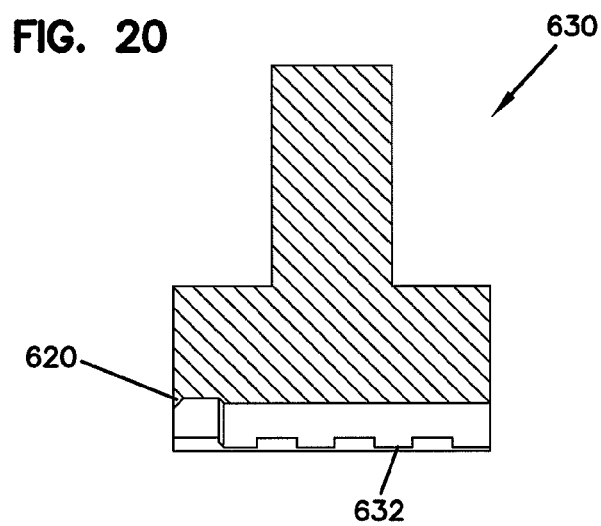
FIG. 20 is a cross-sectional view of the upper tool of FIG. 17.
Figure 21:
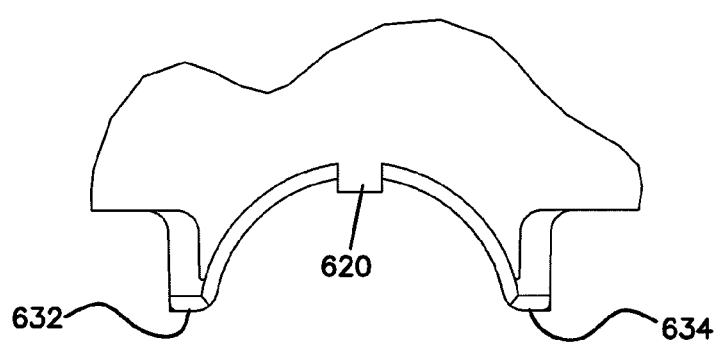
FIG. 21 is an enlarged portion of FIG. 19.
Figure 22:
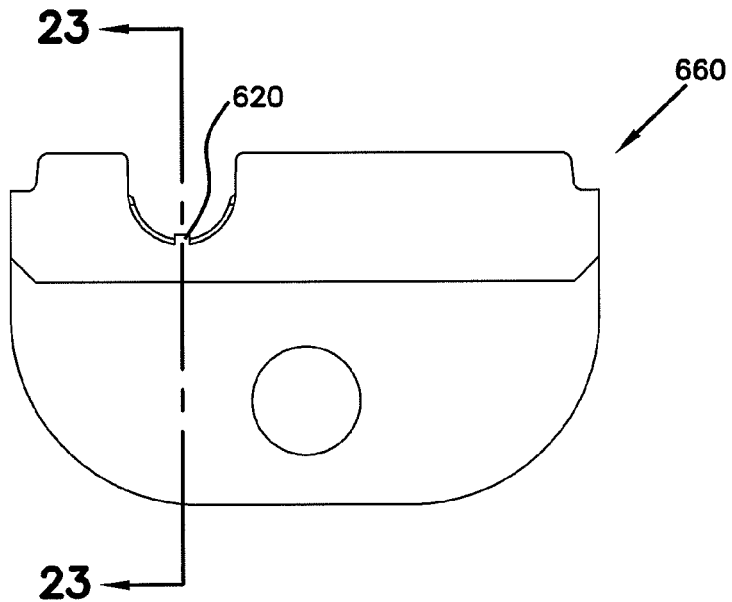
FIG. 22 is an elevation view of the lower tool of FIG. 17.
Figure 23:
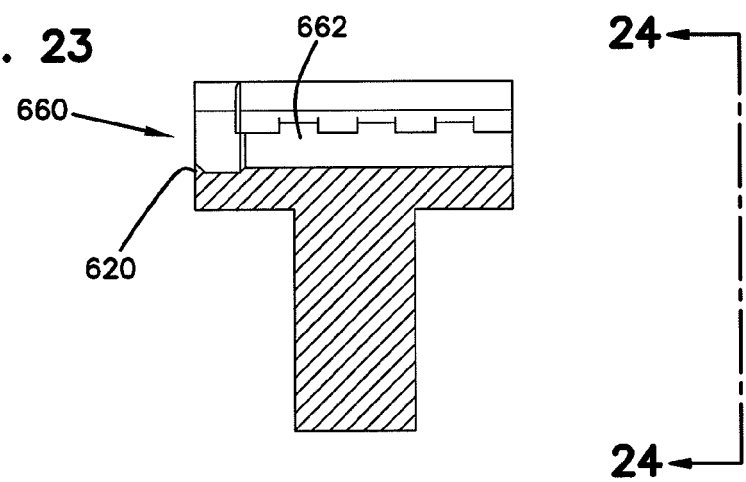
FIG. 23 is a cross-sectional view of the lower tool of FIG. 17.
Figure 24:
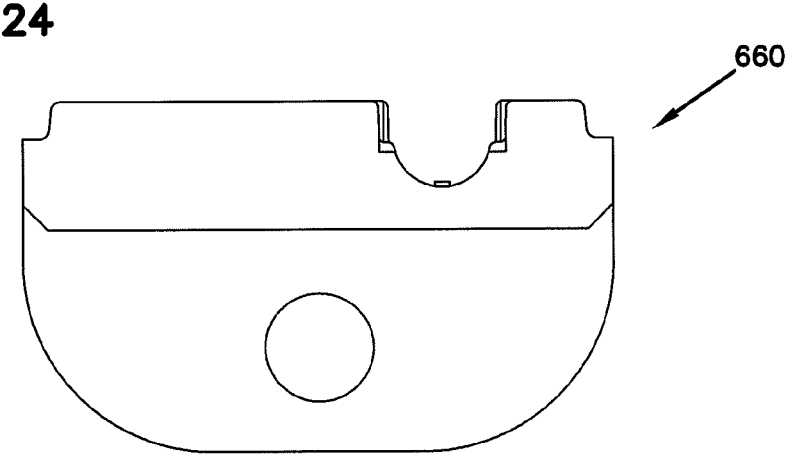
FIG. 24 is a reverse elevation view of the lower tool of FIG. 17.
Figure 25:
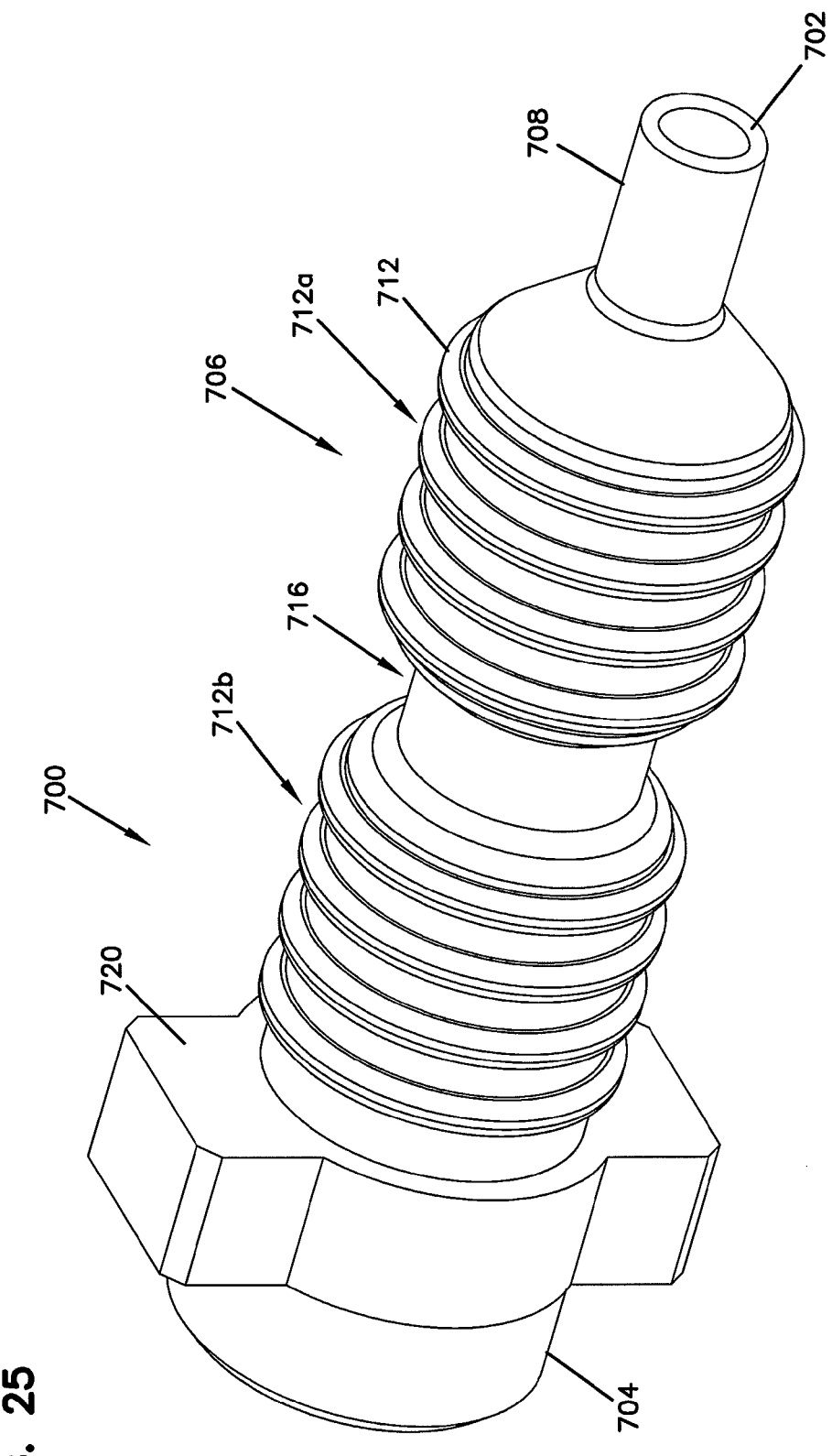
FIG. 25 is a perspective view of an alternative embodiment of a cable anchor.
Figure 26:
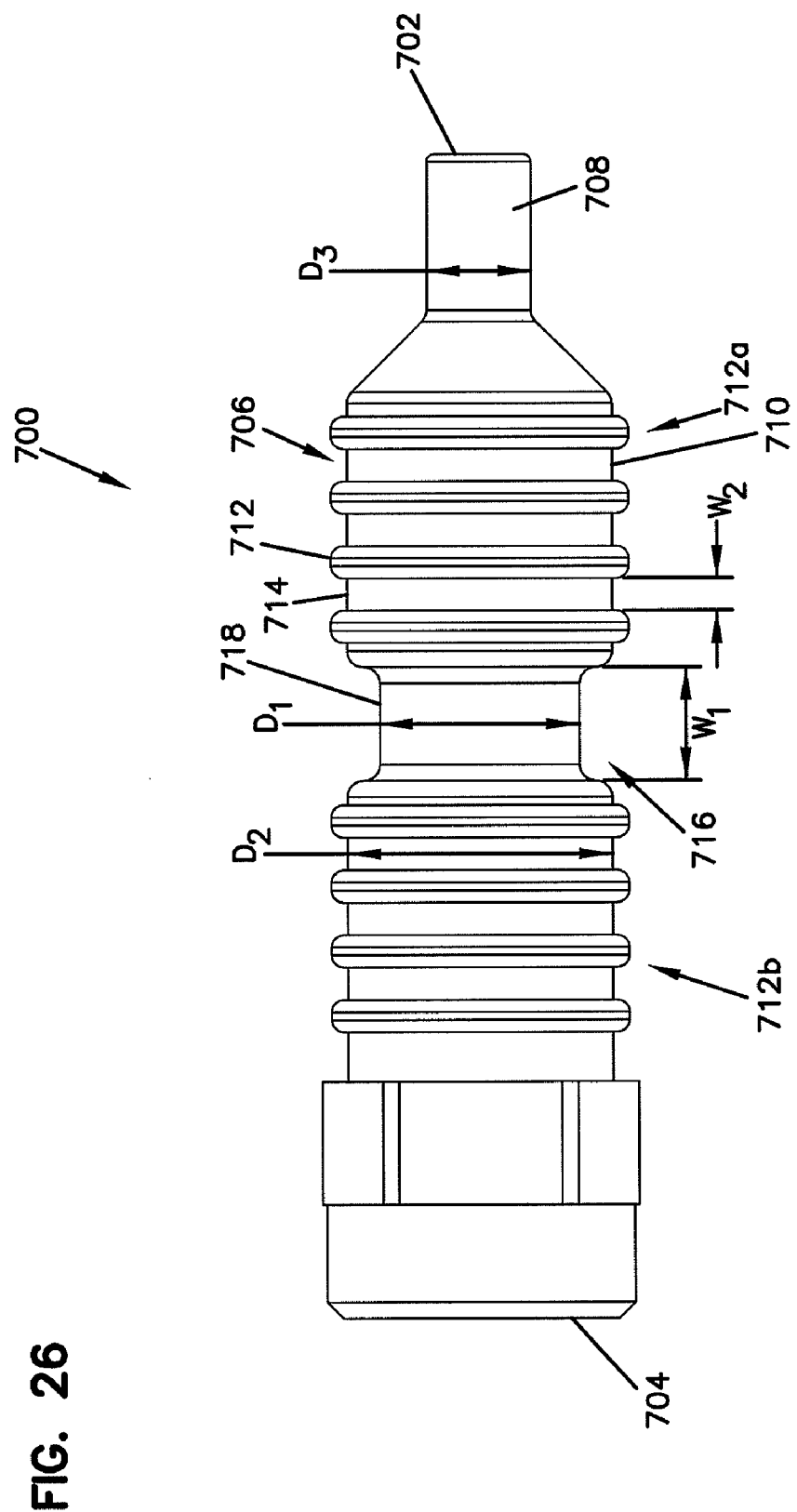
FIG. 26 is a side view of the cable anchor of FIG. 25.
Figure 27:
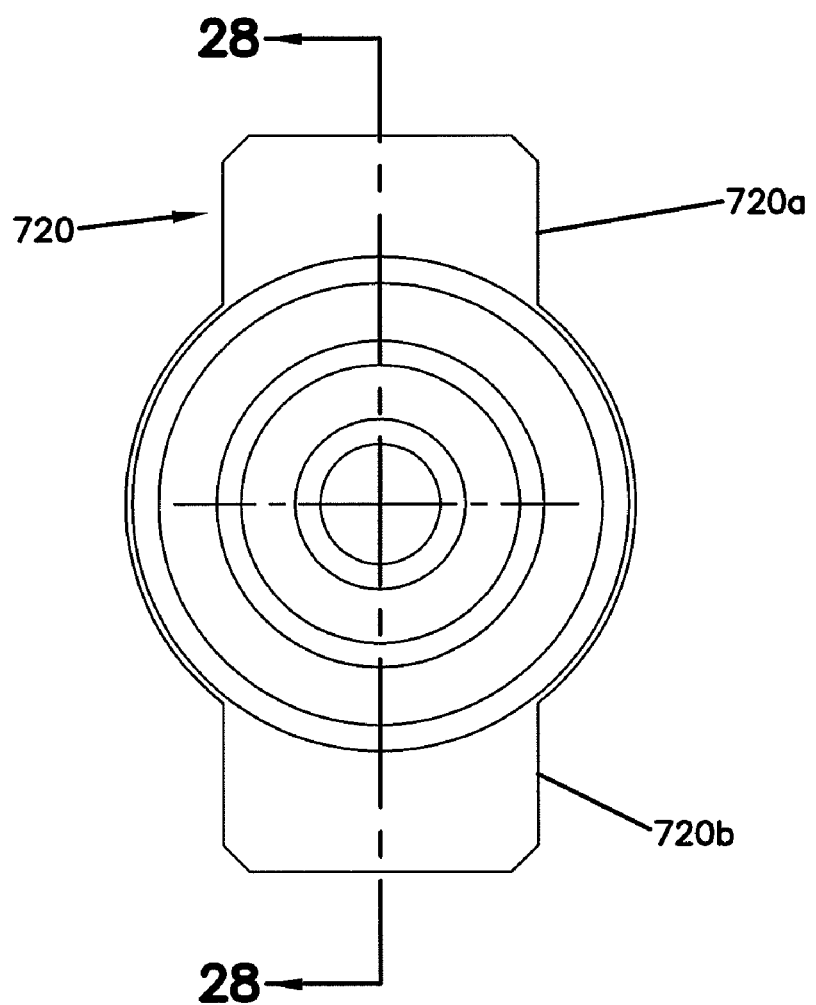
FIG. 27 is an end view of the cable anchor of FIG. 25.
Figure 28:
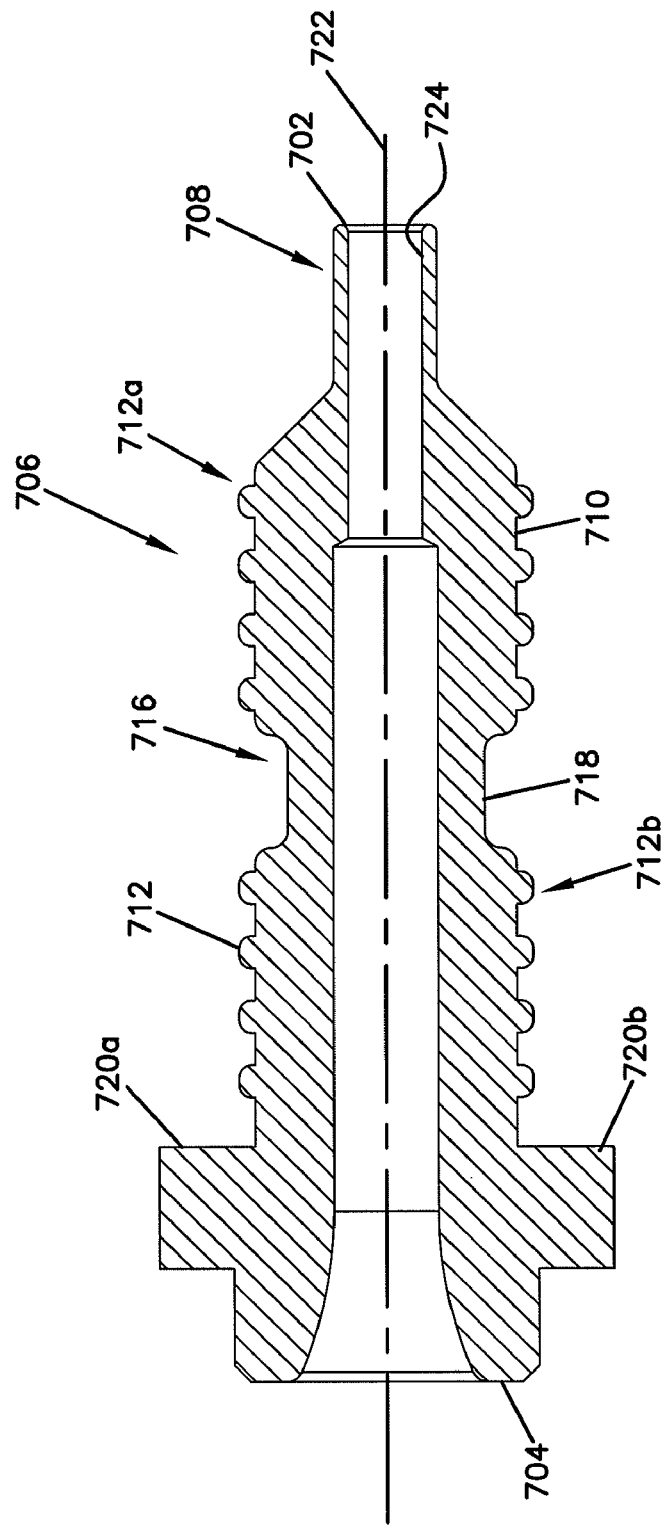
FIG. 28 is a cross-sectional view of the cable anchor taken on line 28-28 of FIG. 27.

A crimping tool 600, illustrated at FIGS. 17-20, can be used to crimp the crimp portion 110 of the crimp sleeve 107, 107'. The crimping tool 600 can also be used to impress the indents 120 at the proximal end 107p of the crimp sleeve 107'. The depicted crimping tool 600 includes a first piece 630 and a second piece 660. The first and the second pieces 630, 660 are adapted to fit together as shown at FIG. 18. The first piece 630 includes a first row of teeth 632 and a second row of teeth 634. Likewise, the second piece 660 includes a first row of teeth 662 and a second row of teeth 664. The first rows of teeth 632, 662 can interlock with each other when the first and the second pieces 630, 660 of the crimping tool are brought together. Likewise, the second rows of teeth 634, 664 can interlock with each other when the first and the second pieces 630, 660 of the crimping tool are brought together. Indenters 620 can be included on both the first and the second pieces 630, 660. The interlocking rows of teeth 632, 634, 662, 664 can be used to form the undulating ridges 116u and/or the offset ridge segments 116s during the crimping process. The indenters 620 can be used to form the indents 120 at the proximal end 107p of the crimp sleeve 107'. The crimping tool 600 can further form other shapes on the crimp sleeve 107, 107' including the cable support portion 108 and a transition between the cable support portion 108 and the crimp portion 110.

The crimp sleeve 107, 107' can initially (before crimping) take a form of a tube (e.g., a hollow cylinder). The uncrimped crimp sleeve 107, 107' can be positioned over the cable anchor 105 with the end portion 426 of the strength members 424 between the crimp portion 110 of the crimp sleeve 107, 107' and the exterior crimp support 101 of the cable anchor 105. The uncrimped crimp sleeve 107, 107' can also be positioned over the end 504 of the cable jacket 502. The crimping tool 600 can be used to form the ridges 116 and the above described related features on the exterior of the crimp sleeve 107, 107' and the cable support portion 108 at the proximal end 107p of the crimp sleeve 107, 107'. The ridges 116 take up material of the crimp sleeve 107, 107' and thereby create a compressive fit between a reduced portion of the crimp sleeve 107, 107' and the exterior crimp support 101 of the cable anchor 105. The reduced portion of the crimp sleeve 107, 107' can include a first partial cylinder opposite a second partial cylinder. The first and the second partial cylinders can be positioned between the ridges 116 as illustrated at FIGS. 4-6 and 10. The first and the second partial cylinders can substantially define a diameter that is smaller than a diameter defined by the cable support portion 108 at the proximal end 107p of the crimp sleeve 107, 107'. The reduced portion of the crimp sleeve 107, 107' can define a cross-dimension that is smaller that a cross-dimension defined by the cable support portion 108 at the proximal end 107p of the crimp sleeve 107, 107'. The cable support portion 108 can remain substantially uncrimped by the crimping tool 600 and thereby substantially remain at a diameter defined by the uncrimped crimp sleeve 107, 107'. Alternatively, the cable support portion 108 can be crimped and/or reduced in diameter by the crimping tool 600. The crimped crimp sleeve 107, 107' can include a transition area between the cable support portion 108 and the crimp portion 110. The crimped crimp sleeve 107, 107' can include a transition area between the cable support portion 108 and the ridges 116.

Referring now to FIGS. 25-28, an alternate embodiment of a cable anchor 700 is shown. The cable anchor 700 is similar to the cable anchor 105. It will be understood that any of the features described in regard to the cable anchor 105 can be used with the cable anchor 700 and any of the features described in regard to the cable anchor 700 can be used with the cable anchor 105.

The cable anchor 700 includes a first end 702 and an oppositely disposed second end 704. In the depicted embodiment, the first end 702 is a proximal end while the second end 704 is a distal end.

The cable anchor 700 further includes an exterior crimp support 706 and a jacket support protrusion 708. The exterior crimp support 706 is disposed between the first and second ends 702, 704. The exterior crimp support 706 includes a base surface 710 and a projection 712 that extends outwardly from the base surface 710. In the depicted embodiment, the projection 712 is a ring-shaped projection. In the subject embodiment, the exterior crimp support 706 includes a plurality of projections 712 that extends outwardly from the base surface 710. The plurality of projections 712 is adapted to increase the surface area of the exterior crimp support 706. This increase in surface area is adapted to further secure the strength members 424 of the fiber optic cable 20. In the depicted embodiment, a gap 714 is disposed between immediately adjacent projections 712 of the plurality of projections 712.

In the depicted embodiment, the plurality of projections 712 includes a first plurality of projections 712a and a second plurality of projections 712b. The first plurality of projections 712a is disposed adjacent to the first end 702 of the cable anchor 700. The second plurality of projections 712b is disposed adjacent to the second end 704 of the cable anchor 700.

The exterior crimp support 706 of the cable anchor 700 defines a groove 716 disposed between the first and second pluralities of projections 712a, 712b. In the depicted embodiment, the groove 716 is an annular groove that includes a base wall 718 that has an outer diameter D1 that is less than an outer diameter D2 of the base surface 710 of the exterior crimp support 706. The groove 716 has a width W1. In the depicted embodiment, the width W1 of the groove 716 is greater than or equal to about two times a width W2 of the gap 714 disposed between immediately adjacent projections 712 of the first and second plurality of projections 712a, 712b. In another embodiment, the width W1 of the groove 716 is greater than or equal to about three times the width W2 of the gap 714.

The jacket support protrusion 708 is disposed at the first end 702 of the cable anchor 700. The jacket support protrusion 708 is adapted for insertion into the opening 506 at the end 504 of the cable jacket 502 of the fiber optic cable 20. In the depicted embodiment, the jacket support protrusion 708 includes an outer diameter D3 that is less than the outer diameter D2 of the base surface 710.

The cable anchor 700 further includes a retention projection 720. The retention projection 720 is adapted to engage the first or second piece 39, 41 of the fiber optic connector 32. In the depicted embodiment, the retention projection 720 is disposed at the second end 704. The retention projection 720 extends in a generally outward direction that is generally perpendicular to a central longitudinal axis 722 of the cable anchor 700. In the depicted embodiment, the cable anchor 700 includes a first retention projection 720a and an oppositely disposed second retention projection 720b.

The cable anchor 700 defines a central passage 724 that extends through the first and second ends 702, 704. The central passage 724 is generally aligned with the central longitudinal axis 722 and is adapted to receive the optical fiber 500 of the fiber optic cable 20.

Figure 29:
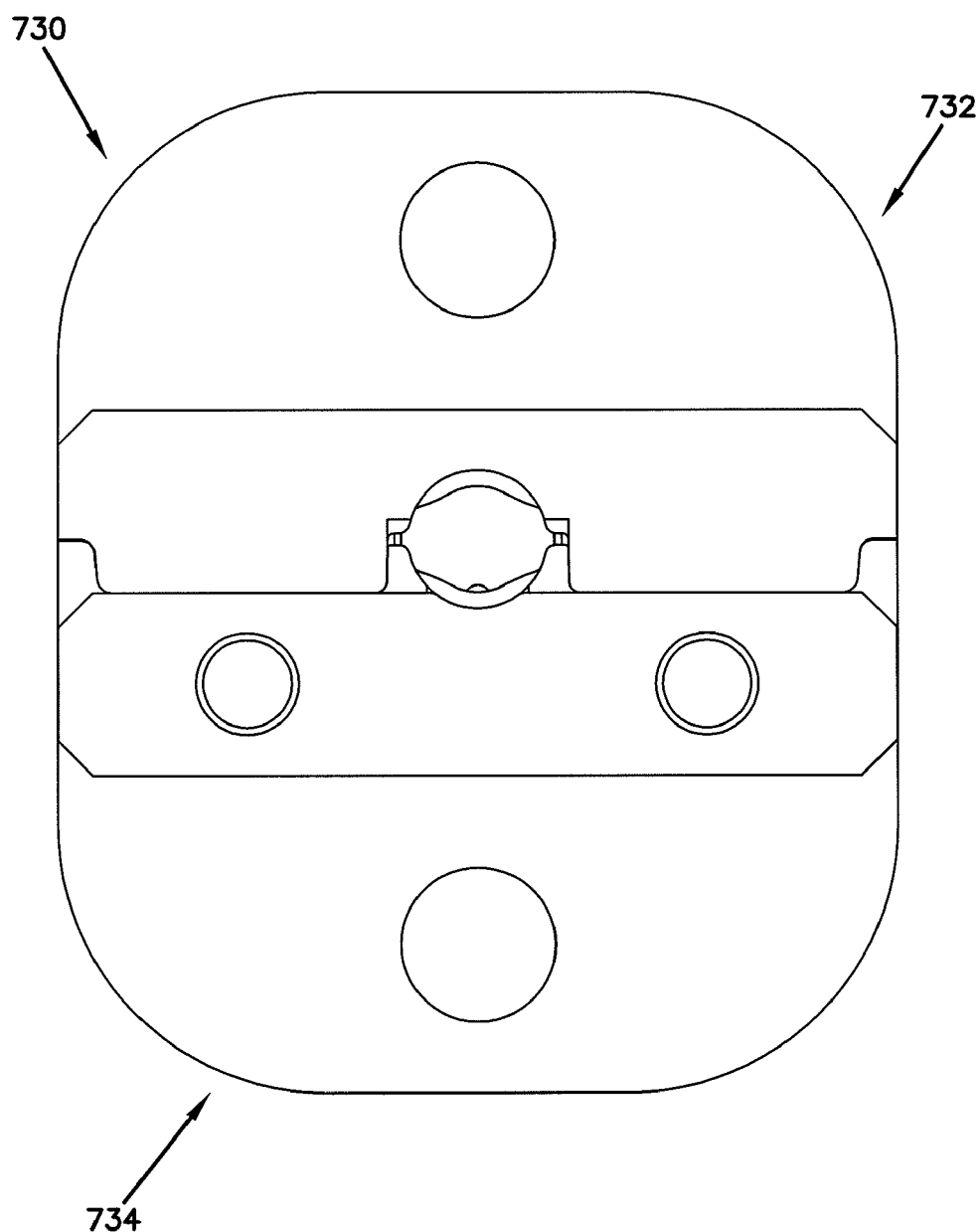
FIG. 29 is an end view of a crimping tool.
Figure 30:
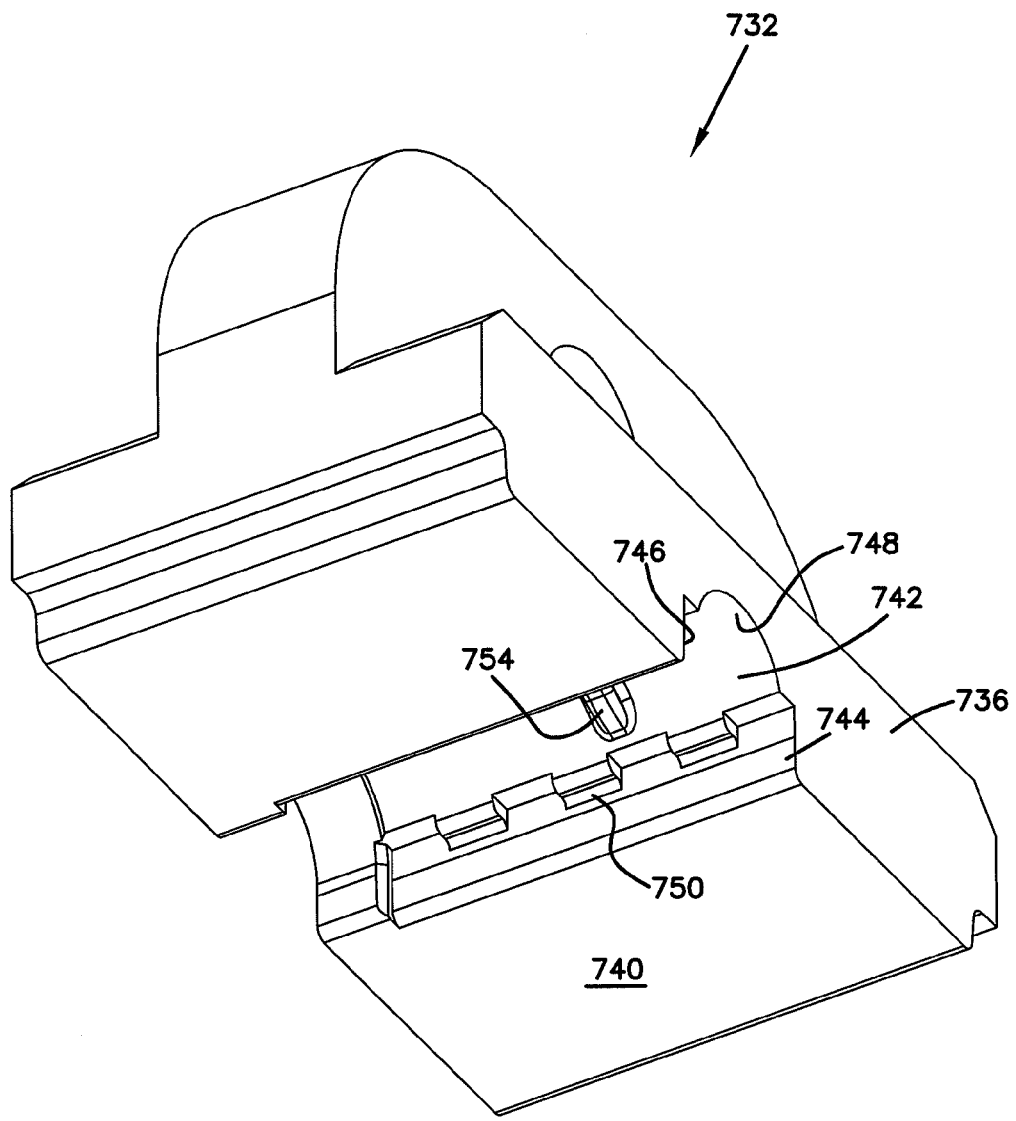
FIG. 30 is a perspective view of a first piece of the crimping tool of FIG. 29.
Figure 31:
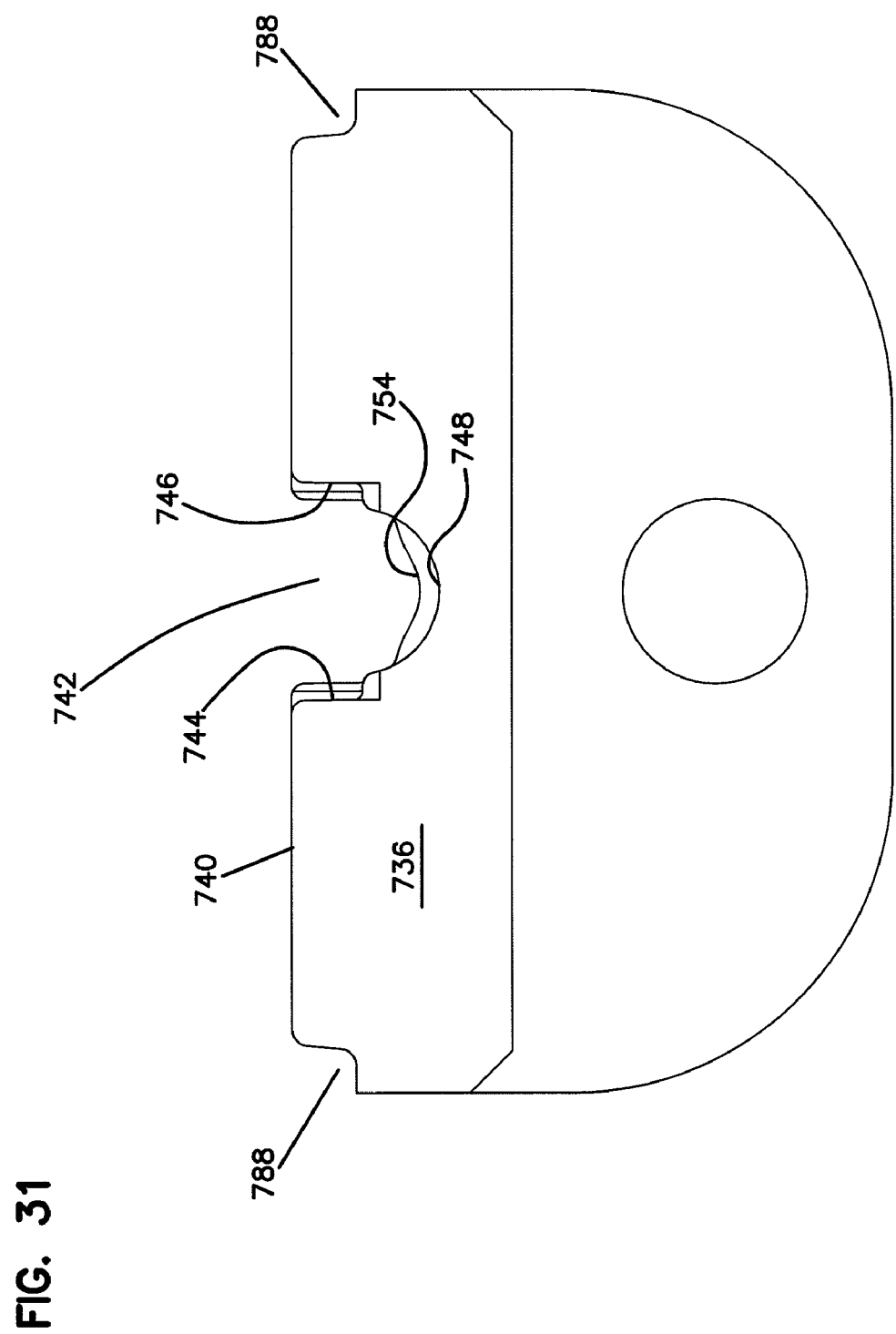
FIG. 31 is a first end view of the first piece of FIG. 30.
Figure 32:
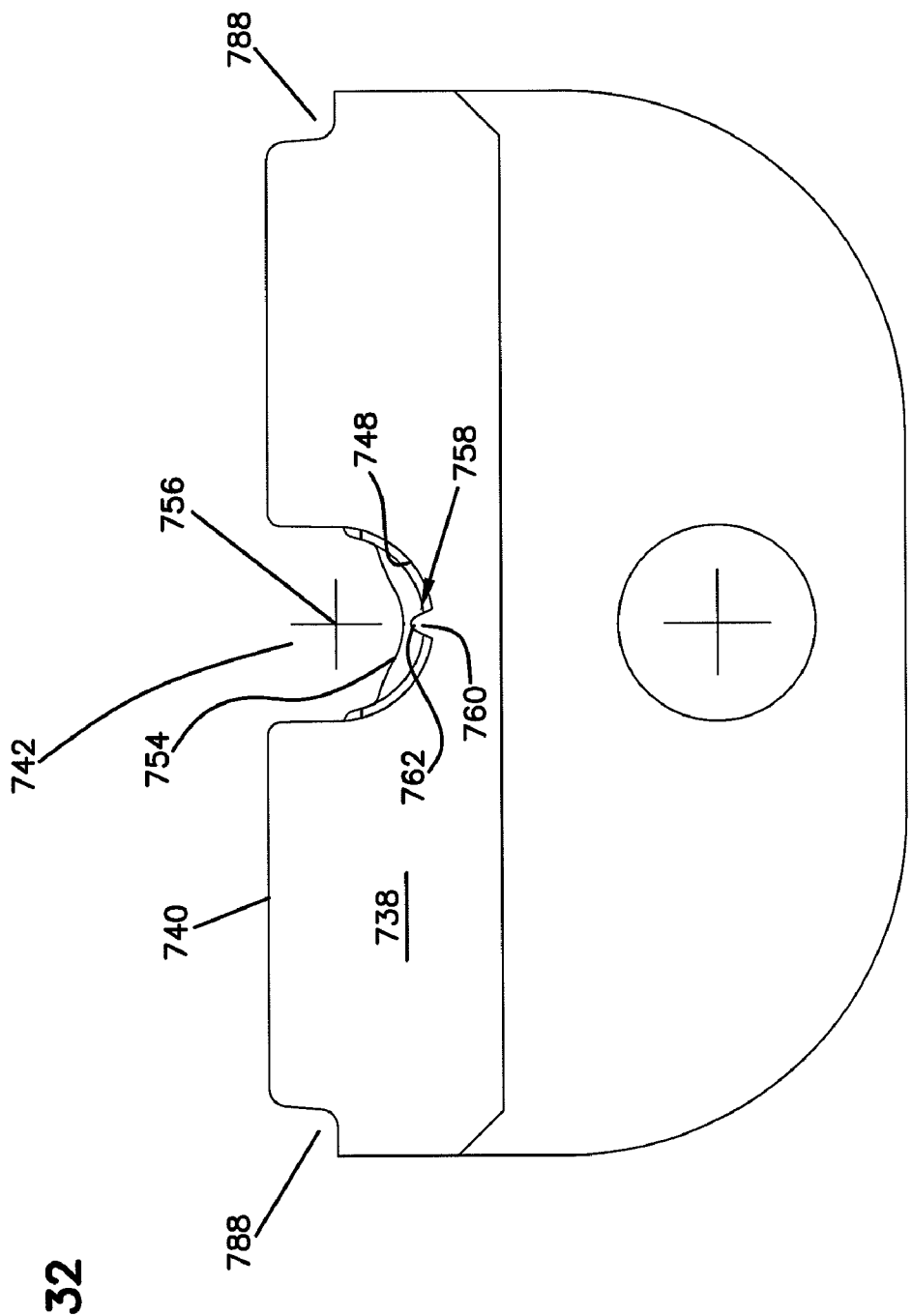
FIG. 32 is a second end view of the first piece of FIG. 30.
Figure 33:
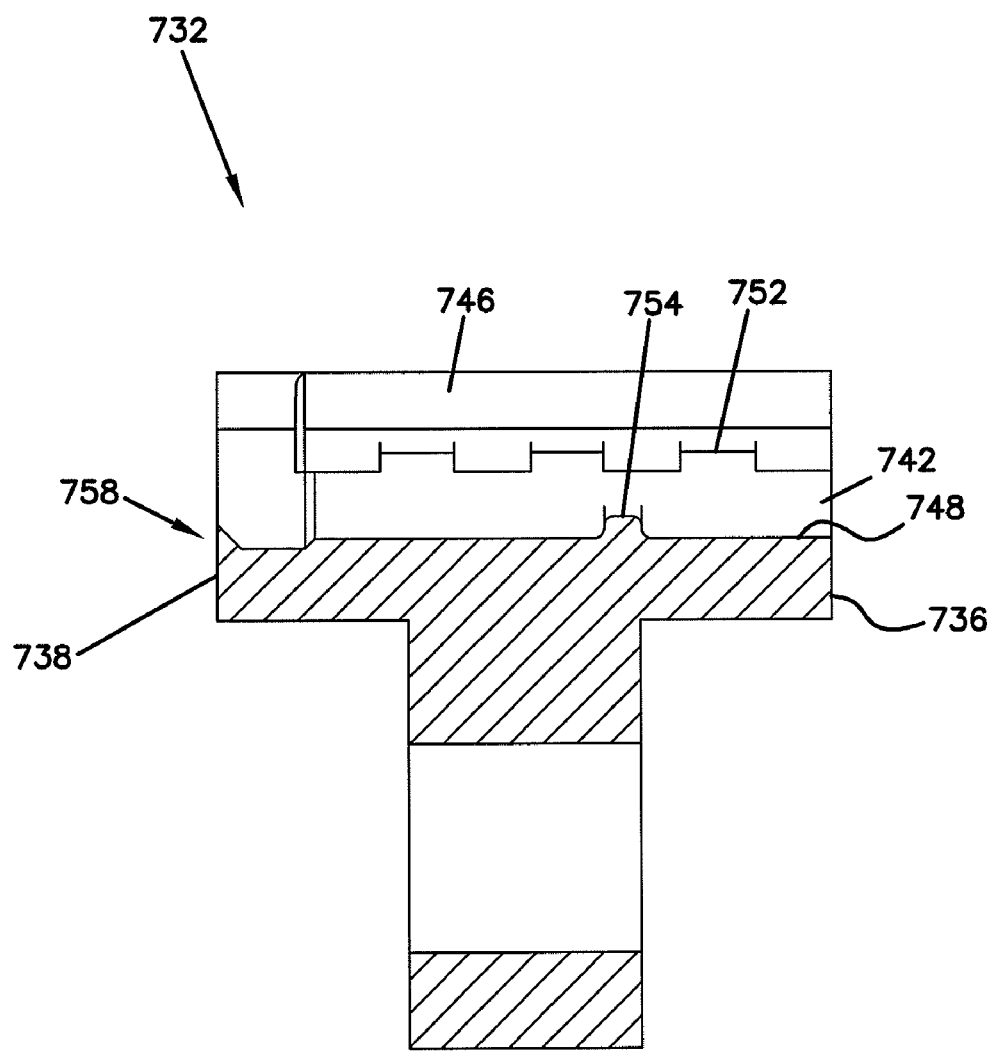
FIG. 33 is a cross-sectional view of the first piece of FIG. 30.
Figure 34:
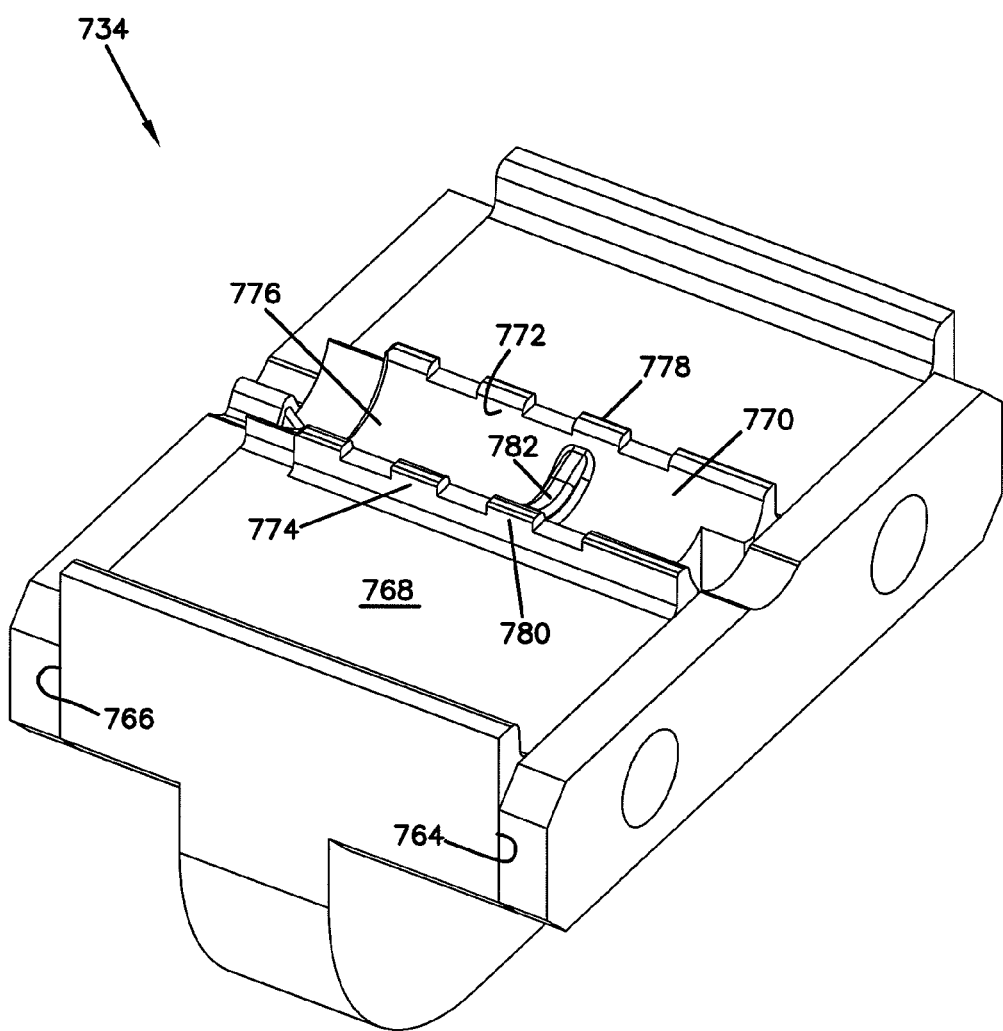
FIG. 34 is a perspective view of a second piece of the crimping tool of FIG. 29.
Figure 35:
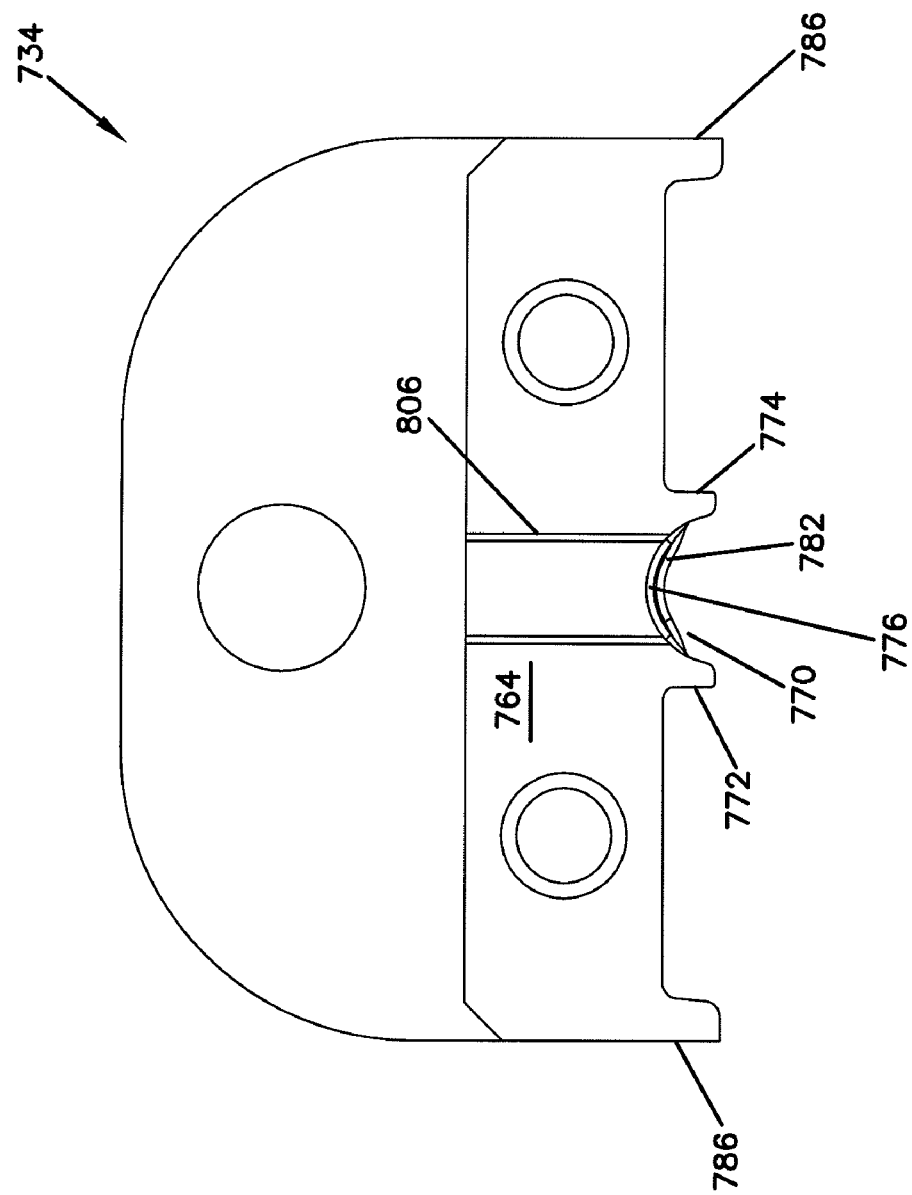
FIG. 35 is a first end view of the second piece of FIG. 34.
Figure 36:
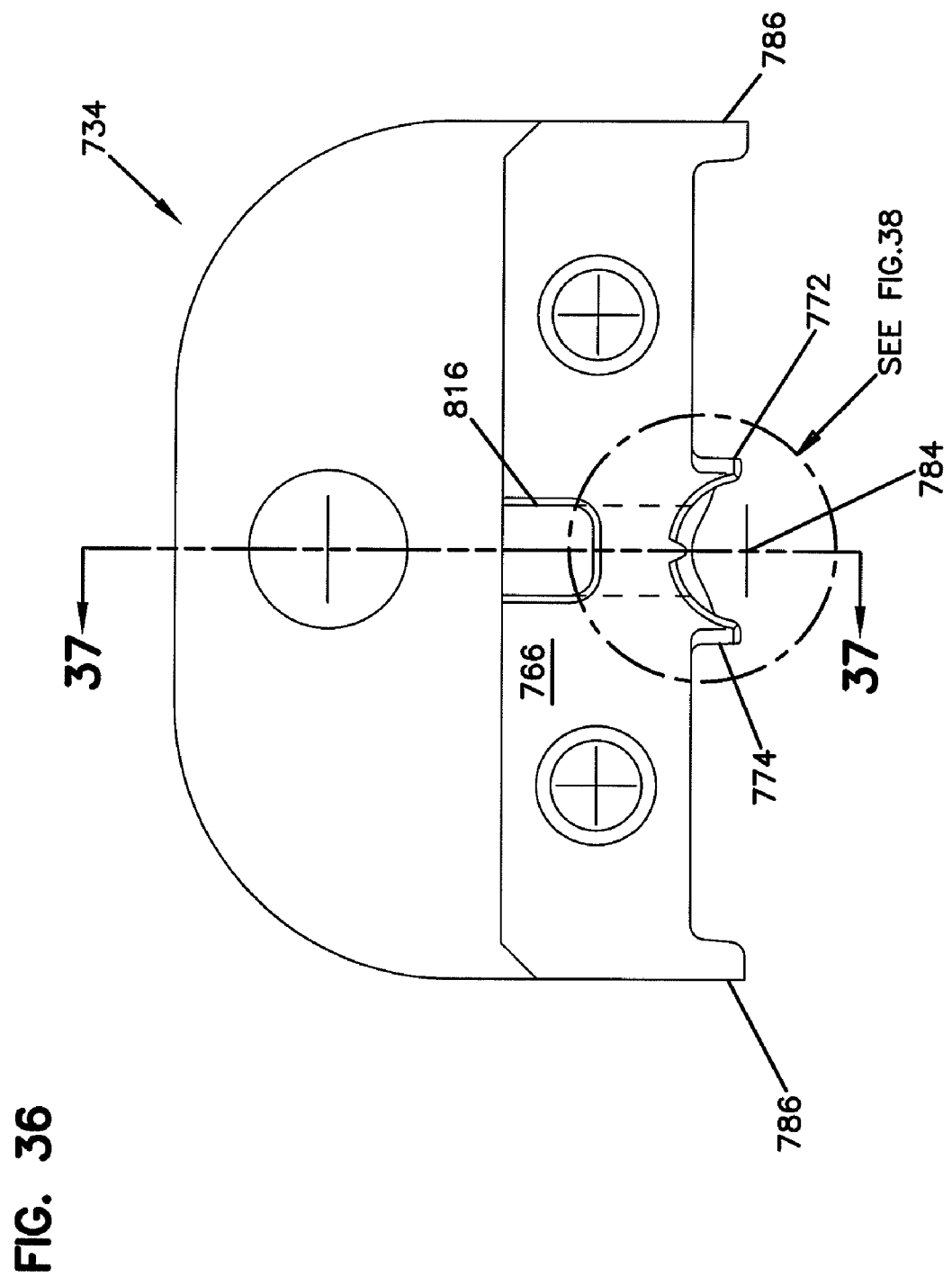
FIG. 36 is a second end view of the second piece of FIG. 34.
Figure 37:
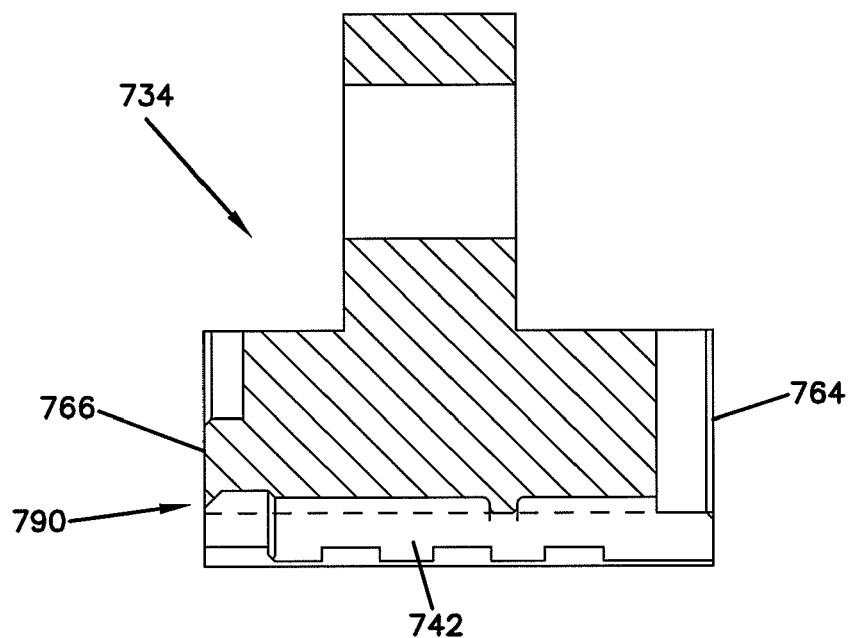
FIG. 37 is a cross-sectional view of the second piece taken on line 37-37 of FIG. 36.
Figure 38:
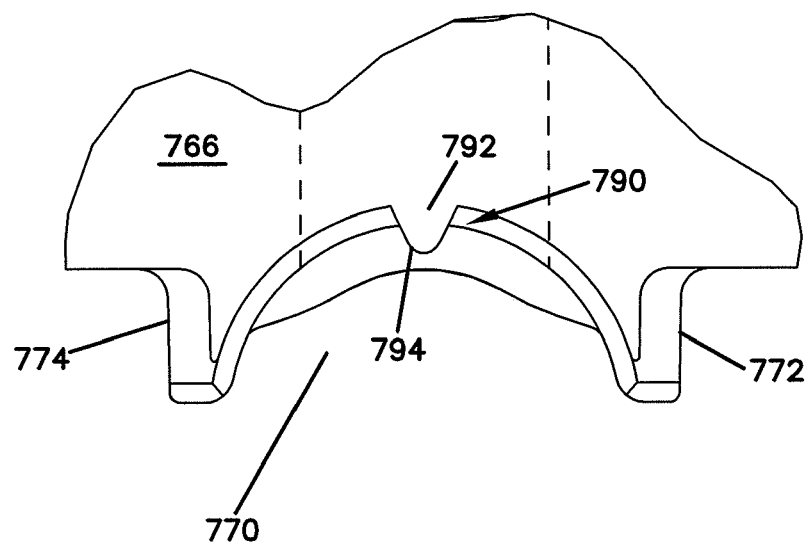
FIG. 38 is an enlarged fragmentary view of an indenter of the second piece.
Figure 39:
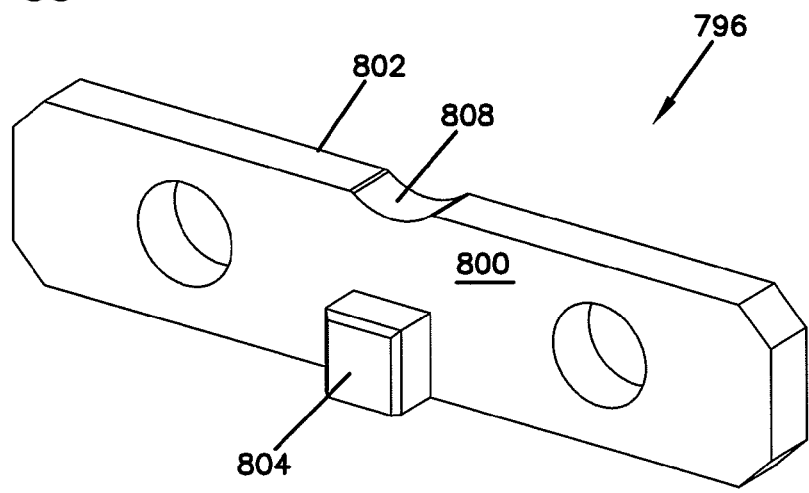
FIG. 39 is a perspective view of a first end plate suitable for use with the second piece of FIG. 34.
Figure 40:
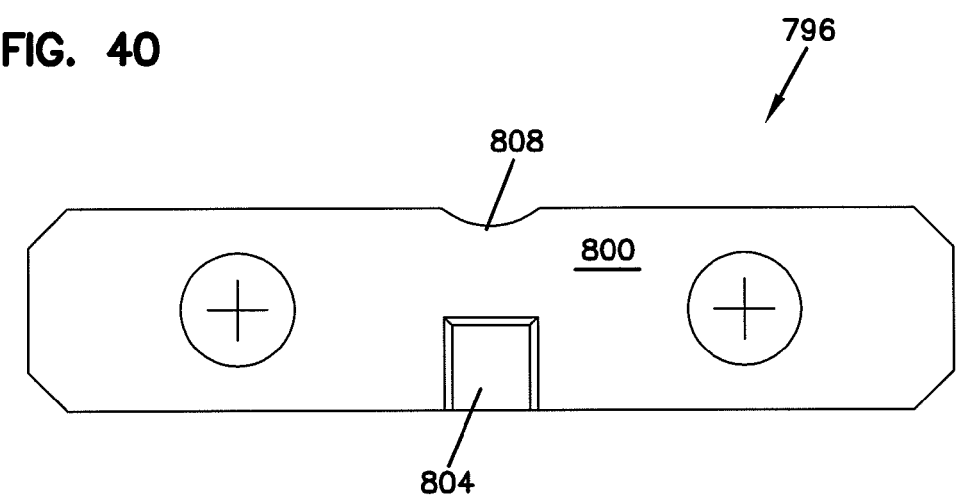
FIG. 40 is an end view of the first end plate of FIG. 39.
Figure 41:
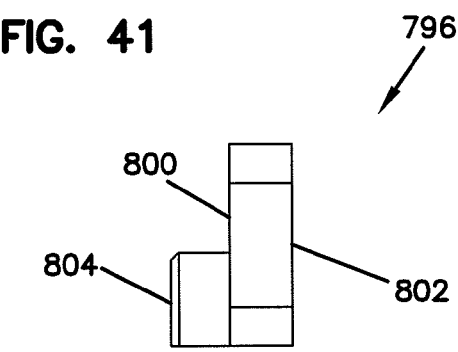
FIG. 41 is a side view of the first end plate of FIG. 39.
Figure 42:
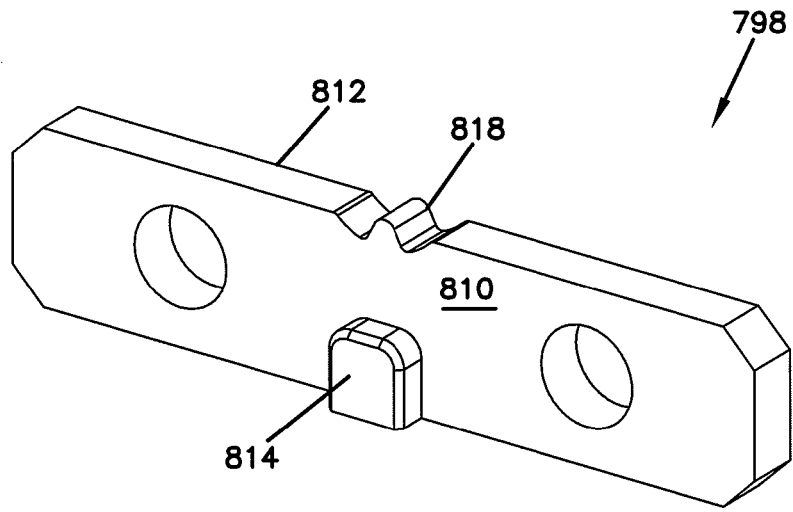
FIG. 42 is a perspective view of a second end plate suitable for use with the second piece of FIG. 34.
Figure 43:
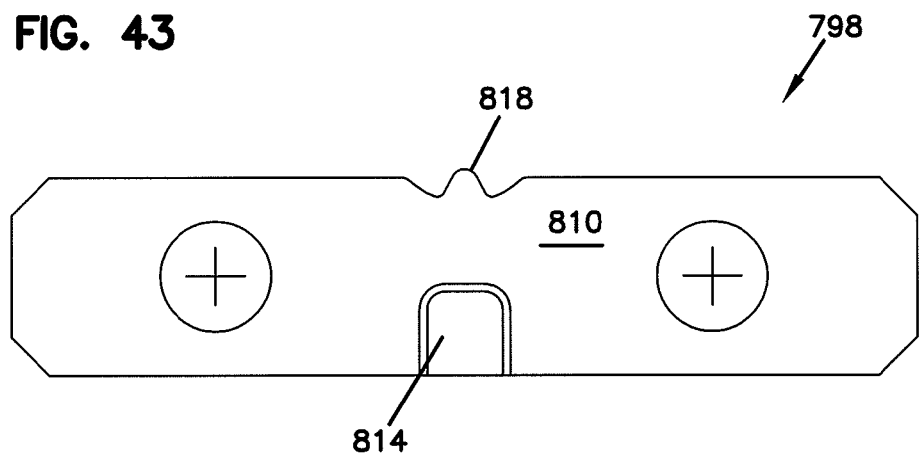
FIG. 43 is an end view of the second end plate of FIG. 42.
Figure 44:
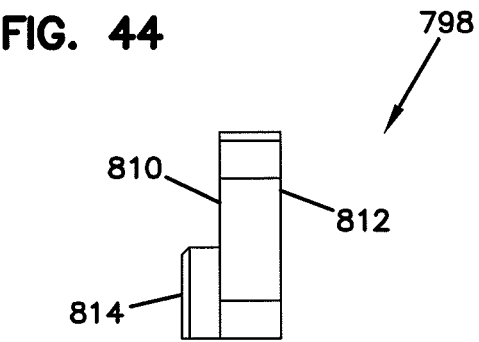
FIG. 44 is a side view of the second end plate of FIG. 42.

Referring now to FIG. 29, an alternate embodiment of a crimping tool 730 is shown. The crimping tool 730 is adapted to crimp the crimp sleeve 107 to the cable anchor 700. The crimping tool 730 includes a first piece 732 and a second piece 734. The first and second pieces 732, 734 are adapted to fit together as shown in FIG. 29.

Referring now to FIGS. 30-33, the first piece 732 of the crimping tool 730 is shown. The first piece 732 includes a first end 736 and an oppositely disposed second end 738. The first piece 732 further includes a first surface 740 that extends between the first and second ends 736, 738. The first surface 740 is generally planar in shape.

The first piece 732 defines a first channel 742 that extends through the first and second ends 736, 738. The first channel 742 is adapted to receive at least a portion of the crimp sleeve 107. The first channel 742 includes a first side 744, an oppositely disposed second side 746 and a base wall 748 that extends between the first and second sides 744, 746. The first side 744 of the first channel 742 of the first piece 732 includes a first row of teeth 750 while the second side 746 of the first channel 742 includes a second row of teeth 752. The base wall 748 is generally arcuate in shape. In the depicted embodiment, the base wall 748 is generally semi-circular shape.

The base wall 748 of the first channel 742 includes a first projection 754 that extends into the first channel 742. In the depicted embodiment, the first projection 754 is generally perpendicular to a longitudinal axis 756 of the first channel 742. The first projection 754 is adapted to compress a first portion of the crimp sleeve 107 into the groove 716 of the cable anchor 700.

In the depicted embodiment, the first piece 732 includes an indenter 758 disposed at the second end 738. The indenter 758 extends into the first channel 742 from the base wall 748. The indenter 758 is adapted to form the indents 120 in the crimp sleeve 107. The indenter 758 has a base end 760 and a free end 762. The base end 760 is engaged to the base wall 748 while the free end 762 extends into the first channel 742. In the depicted embodiment, the base end 760 has a width that is greater than a width of the free end 762.

Referring now to FIGS. 34-38, the second piece 734 of the crimping tool 730 is shown. The second piece 734 includes a first end 764 and an oppositely disposed second end 766. The second piece 734 further includes a second surface 768 that extends between the first and second ends 764, 766. The second surface 768 is generally planar in shape and is adapted to abut the first surface 740 of the first piece 732 of the crimping tool 730.

The second piece 734 defines a second channel 770 that extends through the first and second ends 764, 766. The second channel 770 is adapted to receive a remaining portion of the crimp sleeve 107 that is not disposed in the first channel 742 of the first piece 732. The first and second channels 742, 770 cooperatively crimp the crimp sleeve 107 to the cable anchor 700.

The second channel 770 includes a first side 772, an oppositely disposed second side 774 and a base wall 776 that extends between the first and second sides 772, 774. The first side 772 of the second channel 770 of the second piece 734 includes a first row of teeth 778 while the second side 774 of the second channel 770 includes a second row of teeth 780.

The first row of teeth 778 of the second piece 734 of the crimping tool 730 is adapted for engagement with the first row of teeth 750 of the first piece 732 while the second row of teeth 780 of the second piece 734 is adapted for engagement with the second row of teeth 752 of the first piece 732. The first row of teeth 778 of the second piece 734 is offset from the first row of teeth 750 of the first piece 732 and the second row of teeth 780 of the second piece 734 is offset from the second row of teeth 752 of the first piece 732 so that the undulating ridges 116u and offset ridge segments 116s can be formed during the crimping process.

The base wall 776 is generally arcuate in shape. In the depicted embodiment, the base wall 776 is generally semi-circular shape. The base wall 776 includes a second projection 782 that extends into the second channel 770. In the depicted embodiment, the second projection 782 is generally perpendicular to a second longitudinal axis 784 of the second channel 770. The second projection 782 is adapted to compress a second portion of the crimp sleeve 107 into the groove 716 of the cable anchor 700. The second piece 734 includes an alignment guide 786 that extends outwardly from the second surface 768. In the depicted embodiment, the alignment guide 786 extends outwardly in a direction that is generally perpendicular to the second surface 768. The alignment guide 786 is adapted to align the first and second channels 742, 770 of the first and second pieces 732, 734. In the depicted embodiment, the second piece includes two oppositely disposed alignment guides 786. The alignment guides 786 are adapted to be received in alignment grooves 788 (shown in FIGS. 30-32) defined in the first surface 740 of the first piece 732.

In the depicted embodiment, the second piece 734 includes an indenter 790 disposed at the second end 766. The indenter 790 extends into the second channel 770 from the base wall 776. The indenter 790 is adapted to form the indents 120 in the crimp sleeve 107. The indenter 790 has a base end 792 and a free end 794. The base end 792 is engaged to the base wall 776 while the free end 794 extends into the channel 770. In the depicted embodiment, the base end 792 has a width that is greater than a width of the free end 794.

Referring now to FIGS. 34-44, the first and second ends 764, 766 of the second piece 734 are adapted to receive first and second end plates 796, 798, respectively. The first end plate 796 includes a first longitudinal end surface 800 and an oppositely disposed second longitudinal end surface 802. The first longitudinal end surface 800 is adapted to abut the first end 764 of the second piece 734. The first longitudinal end surface 800 includes an alignment projection 804 that extends outwardly from the first longitudinal end surface 800. The alignment projection 804 is adapted for engagement with an alignment groove 806 defined by the first end 764 of the second piece 734.

The first end plate 796 defines a recess 808 that extends through the first and second longitudinal end surfaces 800, 802. The recess 808 is generally arcuate in shape. In the depicted embodiment, the recess 808 has a radius that is similar to a radius of the base wall 776 of the second channel 770. When the first end plate 796 is engaged to the first end 764, the recess 808 is generally aligned with the second channel 770.

The second end plate 798 includes a first longitudinal end surface 810 and an oppositely disposed second longitudinal end surface 812. The first longitudinal end surface 810 is adapted to abut the second end 766 of the second piece 734. The first longitudinal end surface 810 includes an alignment projection 814 that extends outwardly from the first longitudinal end surface 810. The alignment projection 814 is adapted for engagement with an alignment groove 816 defined by the second end 766 of the second piece 734.

The second end plate 798 includes an indenter 818 that extends outwardly from the second end plate 798. When the second end plate 798 is engaged to the second end 766, the indenter 818 extends into the second channel 770.

The first and second end plates 796, 798 are engaged to the first and second ends 764, 766 of the second piece 734 by a fastener (e.g., screws, bolts, rivets, adhesive, weld, etc.). In the depicted embodiment, the first and second end plates 796, 798 are fastened to the first and second ends 764, 766, respectively, by a plurality of threaded fasteners.

Referring now to FIGS. 25-44, the attachment of the crimp sleeve 107 to the cable anchor 700 will be described. With the jacket support protrusion 708 of the cable anchor 700 disposed in the opening 506 of the end 504 of the fiber optic cable 20, the strength members 424 of the fiber optic cable 20 are routed over the first and second pluralities of projections 712a, 712b of the exterior crimp support 706 of the cable anchor 700.

The crimp sleeve 107 is positioned over the exterior crimp support 706 of the cable anchor 700. The first and second pieces 732, 734 of the crimping tool 730 are positioned over the crimp sleeve 107 so that the crimp sleeve 107 is disposed in the first and second channels 742, 770 of the first and second pieces 732, 734. The first and second pieces 732, 734 of the crimping tool 730 are pressed together so that the first and second surfaces 740, 768 approach each other.

The first and second protrusions 754, 782 in the first and second channels 742, 770 of the first and second pieces 732, 734 cause a portion of the crimp sleeve 107 to be pressed into the groove 716 of the exterior crimp support 706 of the cable anchor 700. The displacement of material of the crimp sleeve 107 into the groove 716 of the cable anchor 700 secures the crimp sleeve 107 to the cable anchor 700 in an axial direction.

The first and second rows of teeth 750, 752, 778, 780 of the first and second pieces 732, 734 form the undulating ridges 116u and the offset ridge segments 116s that are adapted to provide additional holding power between the fiber optic cable 20 and the cable anchor 700. The undulating ridges 116u and the offset ridge segments 116s can further accumulate material during the crimping process resulting in a tighter fit of the crimp sleeve 107 against the strength members 424 and a tighter fit of the crimp sleeve 107 against the end portion 508 of the cable jacket 502.

The example embodiments presented above illustrate a single optical fiber 500 from a fiber optic cable 20 with a cylindrical cable jacket 502 being optically terminated with a single fiber ferrule assembly 43. In other embodiments, a connector includes a multi-termination ferrule (e.g., a ferrule with more than one fiber mounted therein). Example multi-termination ferrules generally have a rectangular configuration. Example multi-fiber fiber optic cables can have a cylindrical or a non-cylindrical cable jacket. The principles of the present disclosure can be applied to various fiber optic cables and fiber optic connectors such as these.

From the forgoing detailed description, it will be evident that modifications and variations can be made in the devices of the disclosure without departing from the spirit or scope of the invention.

What is claimed is:

1. A fiber optic cable attachment system for attaching a fiber optic connector to a fiber optic cable, the fiber optic cable attachment system comprising:

a crimp sleeve extending from a proximal end to a distal end, the proximal end of the crimp sleeve including a cable support portion adapted for receiving an end of a cable jacket of the fiber optic cable, the crimp sleeve including a crimp portion positioned between the cable support portion and the distal end of the crimp sleeve; and a cable anchor including a central passage extending from a proximal end to a distal end of the cable anchor, the proximal end of the cable anchor including a jacket support protrusion adapted for insertion into an opening at the end of the cable jacket, the cable anchor including an exterior crimp support positioned between the jacket support protrusion and the distal end of the cable anchor, the exterior crimp support adapted for insertion into the crimp portion of the crimp sleeve through the distal end of the crimp sleeve;

wherein strength members of the fiber optic cable can be crimped between the crimp portion of the crimp sleeve and the exterior crimp support of the cable anchor;

wherein an end portion of the cable jacket is crimped between the crimp portion of the crimp sleeve and the jacket support protrusion of the cable anchor; and wherein a transitioning portion of the cable jacket adjacent the end portion of the cable jacket can be positioned within the cable support portion of the crimp sleeve.

2. The fiber optic cable attachment system of claim 1, further comprising a crimp tool adapted to crimp the crimp sleeve onto the exterior crimp support and the end portion of the cable jacket, wherein the crimp tool gathers wall material of the crimp sleeve at a first and a second material accumulation region.

3. The fiber optic cable attachment system of claim 2, wherein the first and the second material accumulation regions form a first and a second ridge along opposite sides of the crimp portion of the crimp sleeve.

4. The fiber optic cable attachment system of claim 3, wherein the crimp tool includes a first and a second die each with a first and a second row of interlocking teeth, wherein the first row of interlocking teeth of the first and the second dies is configured to deform the first ridge into a first undulating ridge, and wherein the second row of interlocking teeth of the first and the second dies is configured to deform the second ridge into a second undulating ridge.

5. The fiber optic cable attachment system of claim 3, wherein the crimp tool includes a first and a second die each with a first and a second row of interlocking teeth, wherein the first row of interlocking teeth of the first and the second dies is configured to partially shear the first ridge into a first set of offset ridge segments, and wherein the second row of interlocking teeth of the first and the second dies is configured to partially shear the second ridge into a second set of offset ridge segments.

6. The fiber optic cable attachment system of claim 1, wherein the exterior crimp support is generally cylindrical.

7. The fiber optic cable attachment system of claim 1, wherein the cable anchor includes at least one retention protrusion adapted to engage a pocket or an opening of the fiber optic connector.

8. A fiber optic cable attachment that attaches a fiber optic connector to a fiber optic cable, the fiber optic cable attachment comprising:

a crimp sleeve extending from a proximal end to a distal end, the proximal end of the crimp sleeve including a cable support portion that supports an end of a cable jacket of the fiber optic cable, the crimp sleeve including a crimp portion positioned between the cable support portion and the distal end of the crimp sleeve;

a cable anchor including a central passage extending from a proximal end to a distal end of the cable anchor, the proximal end of the cable anchor including a jacket support protrusion positioned within an opening at the end of the cable jacket, the cable anchor including an exterior crimp support positioned between the jacket support protrusion and the distal end of the cable anchor, the exterior crimp support positioned within the crimp portion of the crimp sleeve;

strength members of the fiber optic cable crimped between the crimp portion of the crimp sleeve and the exterior crimp support of the cable anchor;

an end portion of the cable jacket crimped between the crimp portion of the crimp sleeve and the jacket support protrusion of the cable anchor; and a transitioning portion of the cable jacket adjacent the end portion of the cable jacket, the transitioning portion positioned within the cable support portion of the crimp sleeve.

9. The fiber optic cable attachment of claim 8, further comprising a first piece of the fiber optic connector that includes a first pocket or a first opening, wherein the cable anchor includes a first retention protrusion positioned within the first pocket or the first opening.

10. The fiber optic cable attachment of claim 9, further comprising a second piece of the fiber optic connector that includes a second pocket or a second opening, wherein the cable anchor includes a second retention protrusion positioned within the second pocket or the second opening, wherein the first and the second pieces of the fiber optic connector are attached to each other, and wherein the first and the second retention protrusions of the cable anchor are positioned on opposite sides of the cable anchor.

11. The fiber optic cable attachment of claim 8, wherein the crimp sleeve includes a first and a second material accumulation region positioned on opposite sides of the crimp sleeve.

12. The fiber optic cable attachment of claim 11, wherein the first and the second material accumulation regions form a first and a second ridge on an exterior of the crimp sleeve and a first and a second channel on an interior of the crimp sleeve.

13. The fiber optic cable attachment of claim 12, wherein at least some of the strength members of the fiber optic cable are positioned within the first and/or the second channels on the interior of the crimp sleeve.

14. The fiber optic cable attachment of claim 12, wherein the first and the second ridges on the exterior of the crimp sleeve are undulating ridges.

15. The fiber optic cable attachment of claim 12, wherein the first and the second ridges on the exterior of the crimp sleeve are partially sheared and form a first and a second set of offset ridge segments.

16. The fiber optic cable attachment of claim 8, wherein the cable support portion of the crimp sleeve includes indents at the proximal end of the crimp sleeve.

17. The fiber optic cable attachment of claim 8, wherein the exterior crimp support and the cable jacket are generally cylindrical.

18. The fiber optic cable attachment of claim 8, wherein the end of the cable jacket of the fiber optic cable abuts a shoulder of the cable anchor positioned between the jacket support protrusion and the exterior crimp support.

19. The fiber optic cable attachment of claim 8, wherein the distal end of the cable anchor abuts a spring holder of the fiber optic connector.

20. The fiber optic cable attachment of claim 8, wherein the exterior crimp support includes a plurality of protrusions that extend outwardly.

21. The fiber optic cable attachment of claim 8, wherein the exterior crimp support defines an annular groove.

22. The fiber optic cable attachment of claim 21, wherein the annular groove is disposed between a first plurality of protrusions and a second plurality of protrusions.

23. A method of attaching a fiber optic connector to a fiber optic cable, the method comprising:
inserting an optical fiber of the fiber optic cable through a central passage of a cable anchor;
inserting a jacket support protrusion of the cable anchor into an opening at an end of a cable jacket of the fiber optic cable until the jacket support protrusion is positioned within an end portion of the cable jacket;
positioning strength members of the fiber optic cable around an exterior crimp support of the cable anchor;
positioning a crimp sleeve around the exterior crimp support, the end portion of the cable jacket, and a transition portion of the cable jacket;
crimping an end portion of the strength members between a crimp portion of the crimp sleeve and the exterior crimp support of the cable anchor; and
crimping the end portion of the cable jacket between the crimp portion of the crimp sleeve and the jacket support protrusion of the cable anchor.

* * * * *